US010089491B2

(12) United States Patent
Kong et al.

(10) Patent No.: US 10,089,491 B2
(45) Date of Patent: Oct. 2, 2018

(54) COMPUTING SYSTEM WITH PRIVACY CONTROL MECHANISM AND METHOD OF OPERATION THEREOF

(71) Applicant: Samsung Electronics Co., Ltd., Suwon-si, Gyeonggi-Do (KR)

(72) Inventors: Deguang Kong, San Jose, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 14/967,229

(22) Filed: Dec. 11, 2015

(65) Prior Publication Data

US 2017/0032143 A1 Feb. 2, 2017

Related U.S. Application Data

(60) Provisional application No. 62/199,111, filed on Jul. 30, 2015.

(51) Int. Cl.

| | |
|---|---|
| ***G06F 21/62*** | (2013.01) |
| ***H04L 29/08*** | (2006.01) |
| ***H04L 29/06*** | (2006.01) |
| *G06F 21/55* | (2013.01) |

(52) U.S. Cl.

CPC ........ *G06F 21/6245* (2013.01); *H04L 63/102* (2013.01); *H04L 67/306* (2013.01); *G06F 21/552* (2013.01)

(58) Field of Classification Search

CPC .. G06F 21/6245; H04L 63/102; H04L 67/306
USPC ........................................................... 726/28
See application file for complete search history.

(56) References Cited

U.S. PATENT DOCUMENTS

| | | | | |
|---|---|---|---|---|
| 8,225,376 | B2 * | 7/2012 | Zuckerberg | H04L 67/306 715/731 |
| 8,347,386 | B2 | 1/2013 | Mahaffey et al. | |
| 8,504,481 | B2 | 8/2013 | Motahari et al. | |
| 8,510,843 | B2 * | 8/2013 | Mahaffey | G06F 21/577 713/188 |

(Continued)

FOREIGN PATENT DOCUMENTS

| | | |
|---|---|---|
| KR | 0623629 | 9/2006 |
| WO | 2008141327 A1 | 11/2008 |

OTHER PUBLICATIONS

H. Peng, C. S. Gates, B. P. Sarma, N. Li, Y. Qi, R. Potharaju, C. Nita-Rotaru, and I. Molloy. Using probabilistic generative models for ranking risks of android apps. In ACM Conference on Computer and Communications Security, pp. 241-252, 2012.

(Continued)

*Primary Examiner* — David Pearson
*Assistant Examiner* — Badri Champakesan

(57) ABSTRACT

A computing system includes: a control circuit configured to: determine a privacy baseline for controlling communication for a user, determine an application-specific privacy setting for controlling communication for a first executable program associated with the user, generate a user-specific privacy profile based on the privacy baseline and the application-specific privacy setting, the user-specific privacy profile for controlling an application set including a second executable program; and a storage circuit, coupled to the control circuit, configured to store the user-specific privacy profile.

20 Claims, 8 Drawing Sheets

100 110 102 112 108 104 108 106 106 102

(56) References Cited

U.S. PATENT DOCUMENTS 8,533,844 B2 9/2013 Mahaffey et al.
8,745,739 B2 6/2014 Mahaffey et al.
8,782,217 B1 7/2014 Arone et al.
8,856,939 B2 10/2014 Cai et al.
9,264,445 B2 * 2/2016 Archer .................. G06F 21/577
9,292,694 B1 * 3/2016 Valceanu .............. G06F 21/577
9,317,710 B2 * 4/2016 Jacquin ............... G06F 21/6227
9,338,186 B2 * 5/2016 Wollenstein ............ H04L 63/20
2003/0130893 A1 7/2003 Farmer
2006/0106806 A1 * 5/2006 Sperling ................... G06F 8/65
2007/0168662 A1 * 7/2007 Escott ................. H04L 63/0414 713/168
2007/0250904 A1 * 10/2007 Waller ................ G06F 21/6245 726/1
2007/0297590 A1 12/2007 Macbeth et al.
2008/0294016 A1 * 11/2008 Gobeyn ................. A61B 5/103 600/301
2011/0047594 A1 2/2011 Mahaffey et al.
2011/0178943 A1 7/2011 Motahari et al.
2011/0265187 A1 * 10/2011 Li ....................... G06F 21/6263 726/27
2012/0042392 A1 2/2012 Wu
2012/0222083 A1 8/2012 Oskari et al.
2012/0224057 A1 * 9/2012 Gill ........................ G06F 21/55 348/143
2012/0331567 A1 12/2012 Shelton
2013/0132330 A1 * 5/2013 Hurwitz .................. G06F 21/00 706/52
2013/0263260 A1 10/2013 Mahaffey et al.
2013/0318568 A1 11/2013 Mahaffey et al.
2014/0032691 A1 * 1/2014 Barton .................... H04L 41/00 709/206
2014/0059695 A1 2/2014 Parecki et al.
2014/0108649 A1 * 4/2014 Barton ................ G06F 9/45533 709/224
2014/0189783 A1 * 7/2014 Kapoor ................... G06F 21/51 726/1
2014/0214610 A1 7/2014 Moshir et al.
2014/0258128 A1 * 9/2014 Lei .......................... H04L 63/20 705/44
2014/0289789 A1 9/2014 Poomachandran et al.
2014/0310770 A1 10/2014 Mahaffey
2015/0106949 A1 * 4/2015 Holman .................. G06F 1/163 726/26
2015/0156703 A1 * 6/2015 Feuillette .............. H04L 41/082 709/225
2015/0237062 A1 * 8/2015 Roytman ............ H04L 63/1433 726/25
2015/0326522 A1 * 11/2015 Pu ....................... G06F 21/6245 726/26
2016/0092699 A1 * 3/2016 Riva ..................... H04L 67/306 726/26
2016/0147839 A1 * 5/2016 Kao ........................ H04W 4/21 707/740
2016/0239680 A1 * 8/2016 Holz ................... G06F 21/6245
2016/0246966 A1 * 8/2016 Batrouni ................. G06F 21/60
2016/0292455 A1 * 10/2016 Jebara ............... G06F 17/30867
2017/0039387 A1 * 2/2017 Leonardi ............. G06F 21/6245
2017/0109543 A1 * 4/2017 Li ....................... G06F 21/6245

OTHER PUBLICATIONS

K. Liu and E. Terzi. A framework for computing the privacy scores of users in online social networks. TKDD, 5(1):6, 2010.

R. Pandita, X. Xiao, W. Yang, W. Enck, and T. Xie. Whyper: Towards automating risk assessment of mobile applications. In USENIX Security, pp. 527-542, 2013.

D. Barrera, H. G. Kayacik, P. C. Oorschot, and A. Somayaji. A methodology for empirical analysis of permission-based security models and its application to android. In ACM Conference on Computer and Communications Security, pp. 73-84, 2010.

M. Frank, B. Dong, A. P. Felt, and D. Song. Mining permission request patterns from android and facebook applications. CoRR, abs/1210.2429, 2012.

A. P. Felt, E. Chin, S. Hanna, D. Song, and D. Wagner. Android permissions demystified. In ACM Conference on Computer and Communications Security, pp. 627-638, 2011.

* cited by examiner

COMPUTING SYSTEM WITH PRIVACY CONTROL MECHANISM AND METHOD OF OPERATION THEREOF

CROSS-REFERENCE TO RELATED APPLICATION(S)

This application claims the benefit of U.S. Provisional Patent Application Ser. No. 62/199,111 filed Jul. 30, 2015, and the subject matter thereof is incorporated herein by reference thereto.

TECHNICAL FIELD

An embodiment of the present invention relates generally to a computing system, and more particularly to a system with a privacy control mechanism.

BACKGROUND

Modern consumer and industrial electronics, especially devices such as computing systems, cellular phones, wearable device, such as health monitors or smart watches, and combination devices are providing increasing levels of functionality to support modern life including online social networks. Research and development in the existing technologies can take numerous different directions.

As users become more empowered with the growth in computing, various uses begin to take advantage of this new device space. There are many technological solutions to take advantage of this new device capability to provide increasing functionalities to the user. However, users often face inadequate disclosure and only broad levels control in allowing access by others to information controlled or valued by the users.

Thus, a need still remains for a computing system with privacy control mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment provides a computing system, including: a control circuit configured to: determine a privacy baseline for controlling communication for a user, determine an application-specific privacy setting for controlling communication for a first executable program associated with the user, generate a user-specific privacy profile based on the privacy baseline and the application-specific privacy setting, the user-specific privacy profile for controlling an application set including a second executable program; and a storage circuit, coupled to the control circuit, configured to store the user-specific privacy profile.

An embodiment provides a method of operation of a computing system including: determining a privacy baseline for controlling communication for a user; determining an application-specific privacy setting for controlling communication for a first executable program associated with the user; and generating with a control circuit a user-specific privacy profile based on the privacy baseline and the application-specific privacy setting, the user-specific privacy profile for controlling an application set including a second executable program.

A non-transitory computer readable medium including instructions executable by a control circuit for a computing system, the instructions comprising: determining a privacy baseline for controlling communication for a user; determining an application-specific privacy setting for controlling communication for a first executable program associated with the user; and generating with a control circuit a user-specific privacy profile based on the privacy baseline and the application-specific privacy setting, the user-specific privacy profile for controlling an application set including a second executable program.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
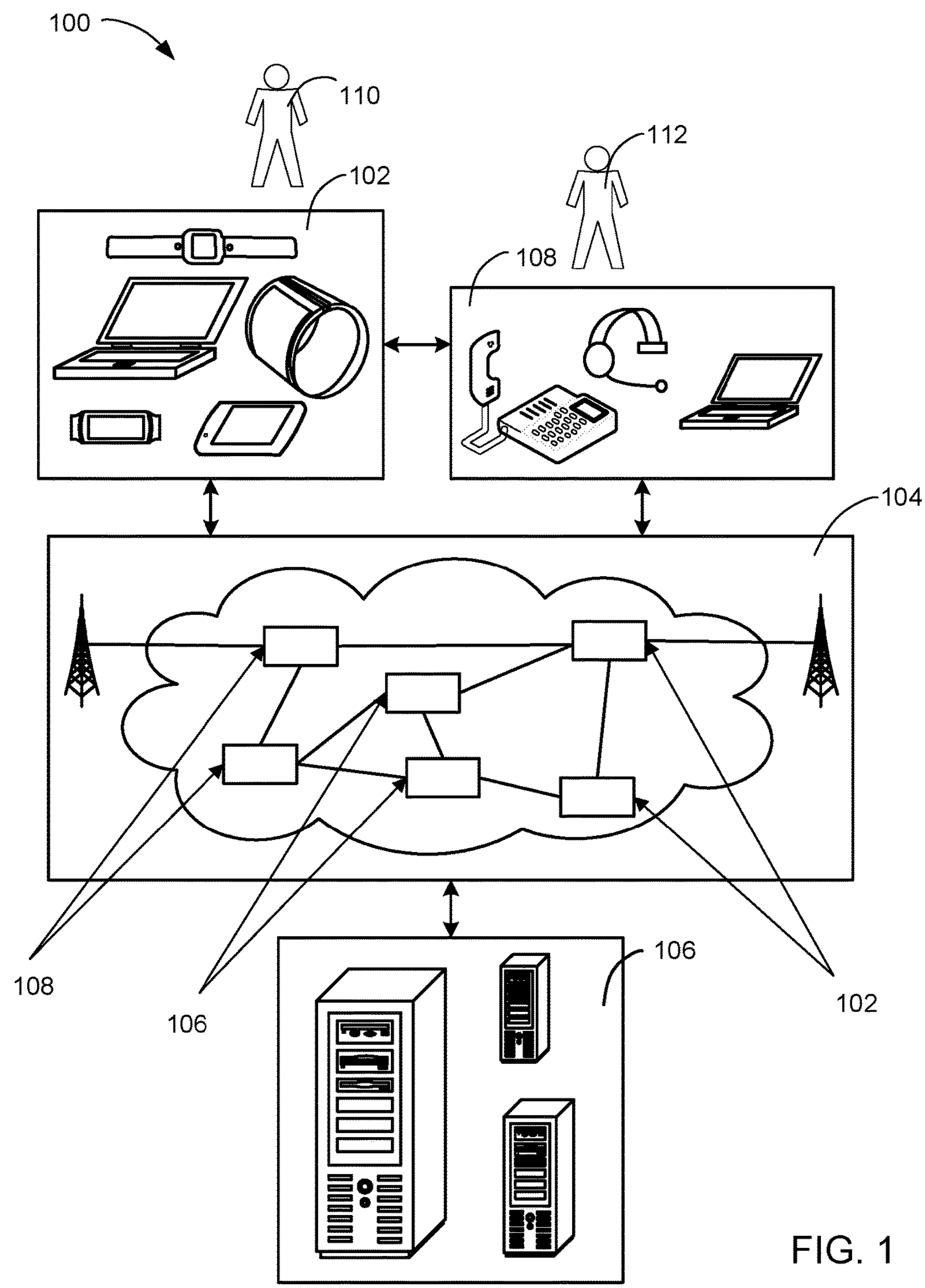
FIG. 1 is a computing system with a privacy control mechanism in an embodiment of the present invention.

The following embodiments of the present invention provide a heterogeneous analysis mechanism for automatically determining privacy risks for one or more application for a user. The heterogeneous analysis mechanism can analyze the risk and generate user-specific privacy profile based on using multiple heterogeneous factors, views, indicators, or a combination thereof.

The heterogeneous analysis mechanism can generate user-specific privacy profile based on analyzing function within the application or any other related information, such as application package or metadata. The heterogeneous analysis mechanism can generate user-specific privacy profile based on analyzing user profile, privacy setting input, application-specific privacy setting, privacy baseline, or a combination thereof. The present invention can further generate privacy setting adjustment, application privacy recommendation, or a combination thereof to improve the privacy protection for the user.

An embodiment of the present invention can also generate an operational mode of the client device including a gesture mode, a monitor mode, a game mode, or a combination thereof based on the physical configuration of the client device, the device proximity of the client device to the target device. The client device can also communicate an input signal to the target device for interacting with the target device.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Referring now to FIG. 1, therein is shown a computing system 100 with a privacy control mechanism in an embodiment of the present invention. The computing system 100 includes a first device 102, such as a client device, connected to a second device 106, such as a client device or a server. The first device 102 can communicate with the second device 106 with a network 104, such as a wireless or wired network.

For example, the first device 102 can be of any of a variety of consumer devices, such as a cellular phone, a personal digital assistant, a notebook computer, a tablet computer, a wearable device, or other multi-functional mobile communication or entertainment device. The first device 102 can couple, either directly or indirectly, to the network 104 to communicate with the second device 106 or can be a stand-alone device.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

The computing system 100 can further include a third device 108. The third device 108, such as a client or a server, can be connected to the first device 102, the second device 106, or a combination thereof. The third device 108 can be similar to the first device 102, the second device 106, or a combination thereof.

For example, the third device 108 can include any variety of consumer devices, wearable devices, servers, stationary or mobile devices, centralized or decentralized devices, or a combination thereof. The third device 108 can couple, either directly or indirectly, to the network 104 to communicate with another device, couple directly to another device, or can be a stand-alone device.

For illustrative purposes, the navigation system 100 is described with the third device 108 as a mobile computing device, although it is understood that the third device 108 can be different types of devices. For example, the third device 108 can also be a non-mobile computing device, such as a server, a server farm, or a desktop computer.

Also for illustrative purposes, the navigation system 100 is shown with the first device 102, the second device 106, and the third device 108 as end points of the network 104, although it is understood that the navigation system 100 can have a different partition between the first device 102, the second device 106, the third device 108, and the network 104. For example, the first device 102, the second device 106, the third device 108, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

A user 110 can include a person or an entity utilizing the privacy control mechanism. The user 110 can utilize the computing system 100 or a device therein, such as the first device 102, the second device 106, or a combination thereof.

For a more specific example, the user 110 can be associated with the first device 102. The user 110 can include the person or the entity directly interfacing or directly interacting with the first device 102, having ownership or control of the first device 102, having direct physical contact with the first device 102, interacting or interfacing with the second device 106 through the first device 102, or a combination thereof.

A remote operator 112 can include a person or an entity different from the user 110 utilizing the computing system 100 or a device therein, such as the second device 106, the third device 108, or a combination thereof. For a more specific example, the remote operator 112 can include the person or the entity directly interfacing or directly interacting with the third device 108, having ownership or control of the third device 108, having direct physical contact with the third device 108, interacting or interfacing with the second device 106 through the third device 108, or a combination thereof.

For illustrative example, the computing system 100 can provide detailed information or control regarding data concerning the user 110. The user 110 can utilize the computing system 100 and the privacy control mechanism to control access to the data regarding the user 110. The computing system 100 can control access to the data by the second device 106, the third device 108, the remote operator 112, or a combination thereof. The computing system 100 can control access in a variety of manner. Details regarding the control for the access are discussed below.

Figure 2:
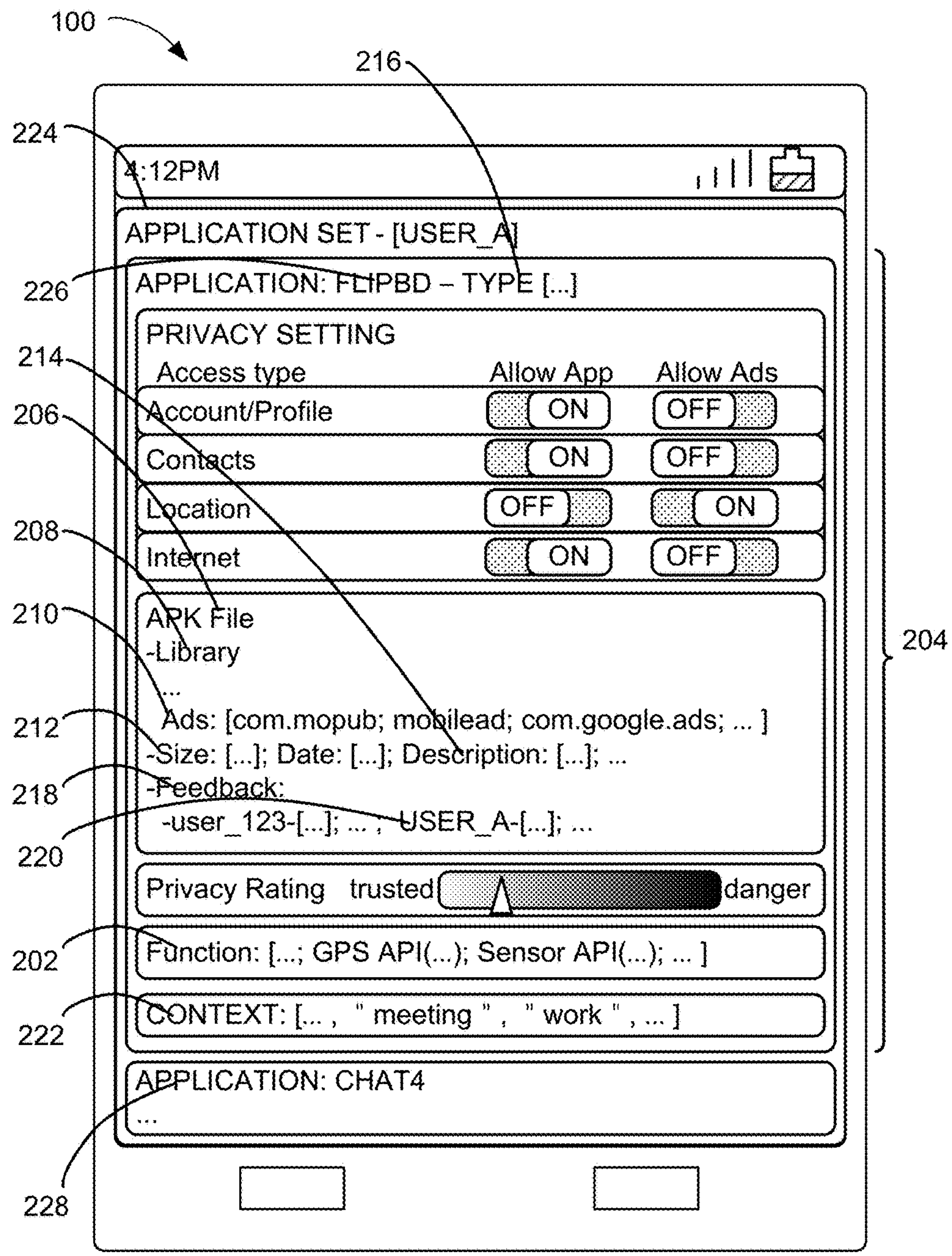
FIG. 2 is an example of a display interface of the computing system.

Referring now to FIG. 2 therein is shown an example of a display interface of the computing system 100. The computing system 100 can include a function 202. The function 202 is a reaction or a feature enabled by the computing system 100 or by one or more devices therein. The function 202 can be implemented as software instruction, a portion of a dedicated circuitry, or a combination thereof.

For example, the function 202 can include an action or a result or an output thereof performed by the computing system 100 or by one or more devices therein. Also for example, the function 202 can respond to an input or a stimulus from the user 110 of FIG. 1 or the remote operator 112 of FIG. 1, be controlled by the user 110 or the remote operator 112, provide the feature or the result to the user 110 or the remote operator 112, or a combination thereof. Also for example, the function 202 can include a routine, a protocol, a tool, or a combination thereof included in the application programming interface (API).

The computing system 100 can include an application 204. The application 204 is a computer program or a set thereof designed to implement one or more instances of task or activities. The application 204 can include a computer implemented function, a computer executable file, or a combination thereof. The application 204 can include or implement one or more instances of the function 202. The application 204 can be separate from system software or operating system.

The user 110, the remote operator 112, or a combination thereof can initiate, control, interact with, access, or a combination thereof for the application 204 using the first device 102 of FIG. 1, the second device 106 of FIG. 1, the third device 108 of FIG. 1, or a combination thereof. The application 204 can be stored on the first device 102, the second device 106, the third device 108, or a combination thereof. The application 204 can further be implemented or executed using the first device 102, the second device 106, the third device 108, or a combination thereof.

The application 204 can further be associated with an application package 206. The application package 206 can include a grouping of files for implementing the application 204. The application package 206 can be used to distribute, install, execute or implement, or a combination thereof for the application 204.

For example, the application package 206 can include the application 204, an application library 208 associated thereto, metadata 212 associated thereto, other support files, or a combination thereof. As a more specific example, the application package can include files corresponding to specific file formats, such as Android Application Package (APK), Windows Installer or "MSI" files, or Apple Application Bundle.

The application 204 can be associated with the application library 208. The application package 206 can include the application library 208. The application library 208 can include one or more resources utilized by the application or other software. The application library 208 can be used to develop the application 204. The application library 208 can further include one or more instances of the function 202 utilized by or included in the application 204.

For example, the application library 208 can include a static library or a dynamic-link library. As a more specific example, the application library 208 can further include configuration data, documentation, help data, a subroutine, a class, code, an instruction, an external function, or a combination thereof. Also as a more specific example, the application library 208 can include the API. Also as a more specific example, the application library 208 can include a periphery access set 210.

The periphery access set 210 can represent one or more non-operational or supplemental resources utilized by the application or other software. The periphery access set 210 can be separate from the function 202, the feature or the goal of the application 204, or a combination thereof. For example, the periphery access set 210 can include a library of or a connection to advertisements or help information.

The metadata 212 can include information about the application 204. The metadata 212 can include structural information, descriptive information, or a combination thereof about the application 204. For example, the metadata 212 can include a status, an access information, a size, a quality, a categorization or a type, a configuration, a setting, or a combination thereof.

The metadata 212 can include an application description 214. The application description 214 is a representation of or a depiction of the application 204 for describing the application 204 to an end user. The application description 214 can include text, image, audible information, or a combination thereof.

For example, the application description 214 can include a description or an introduction from a developer, a programmer, a distributer, a manufacturer, or a combination thereof. Also for example, the application description 214 can include a synopsis, a summary, a manual, a specification, or a combination thereof for the application 204. Also for example, the application description 214 can include a listing of details for communications for the application 204, such as communication parties, communication scenarios or situations, communicated data, or a combination thereof.

The application 204 can correspond to an application type 216. The application type 216 can include a categorical description of the application 204. The application type 216 can include the categorization according to the developer, the programmer, the distributer, the manufacturer, or a combination thereof. The application type 216 can further include categorization commonly known or used by end users.

For example, the application type 216 can include categories including, games, word processing, social networking, mapping or navigation, note taking, health, beauty, or a combination thereof for describing the application 204. Also for example, the application type 216 can be categorization based on or according to communication details, such as based on or according to communication parties, communication scenarios or situations, communicated data, or a combination thereof for the application 204.

The application 204 can further correspond to community feedback 218. The community feedback 218 is information provided by end users for describing or rating the application 204. The community feedback 218 can include written or spoken description, scores, number of downloads, frequency of use, or a combination thereof for the application 204 by one or more end users. For example, the community feedback 218 can include a review, a blog entry, a comment, a score or a rating, an evaluation, or a combination thereof from users of the application 204, a magazine or a publication, or a combination thereof.

The community feedback 218 can include user feedback 220. The user feedback 220 is the community feedback 218 from the user 110. The user feedback 220 can include the written or spoken description, score, usage detail, or a combination thereof from the user 110 regarding the application 204.

The computing system 100 can further determine and utilize usage context 222. The usage context 222 can include a representation of situation, condition, meaning, abstract value or significance, or a combination thereof regarding the user 110, the application 204, or a combination thereof.

For example, the usage context 222 can include a label or a value representing the situation, the condition, the meaning, the abstract value or significance, or a combination thereof. Also for example, the usage context 222 can include a representation of a general situation or set of indications or data corresponding to the general situation.

As a more specific example, the usage context 222 can include a time of usage, a location of the user or the device, an action or occurrence preceding or following the usage of the application 204, a duration of usage, an input stimulus, an output result, a pattern thereof, or a combination thereof associated with the user 110 utilizing the application 204 or available through the device facilitating the application 204. The usage context 222 can include data associated with current usage, previous usage, or a combination thereof.

The computing system 100 can further determine and utilize an application set 224. The application set 224 is a representation of grouping of instances of the application 204 corresponding to one end user. The application set 224 can represent the applications owned, used, authorized, or a combination thereof for the user 110. The application set 224 can further represent the applications stored on or implemented with a specific device including the first device 102.

For example, the application set 224 can include a first executable program 226 and a second executable program 228. The first executable program 226 can be an instance of the application 204 and the second executable program 228 can be a different instance of the application 204.

As a more specific example, the application set 224 can represent the first executable program 226 and the second executable program 228 owned by, previously used by, authorized for access by, or a combination thereof by the user 110. Also as a more specific example, the application set 224 can represent the first executable program 226 and the second executable program 228 can represent the applications stored on or configured to be implemented with the first device 102.

Figure 3:
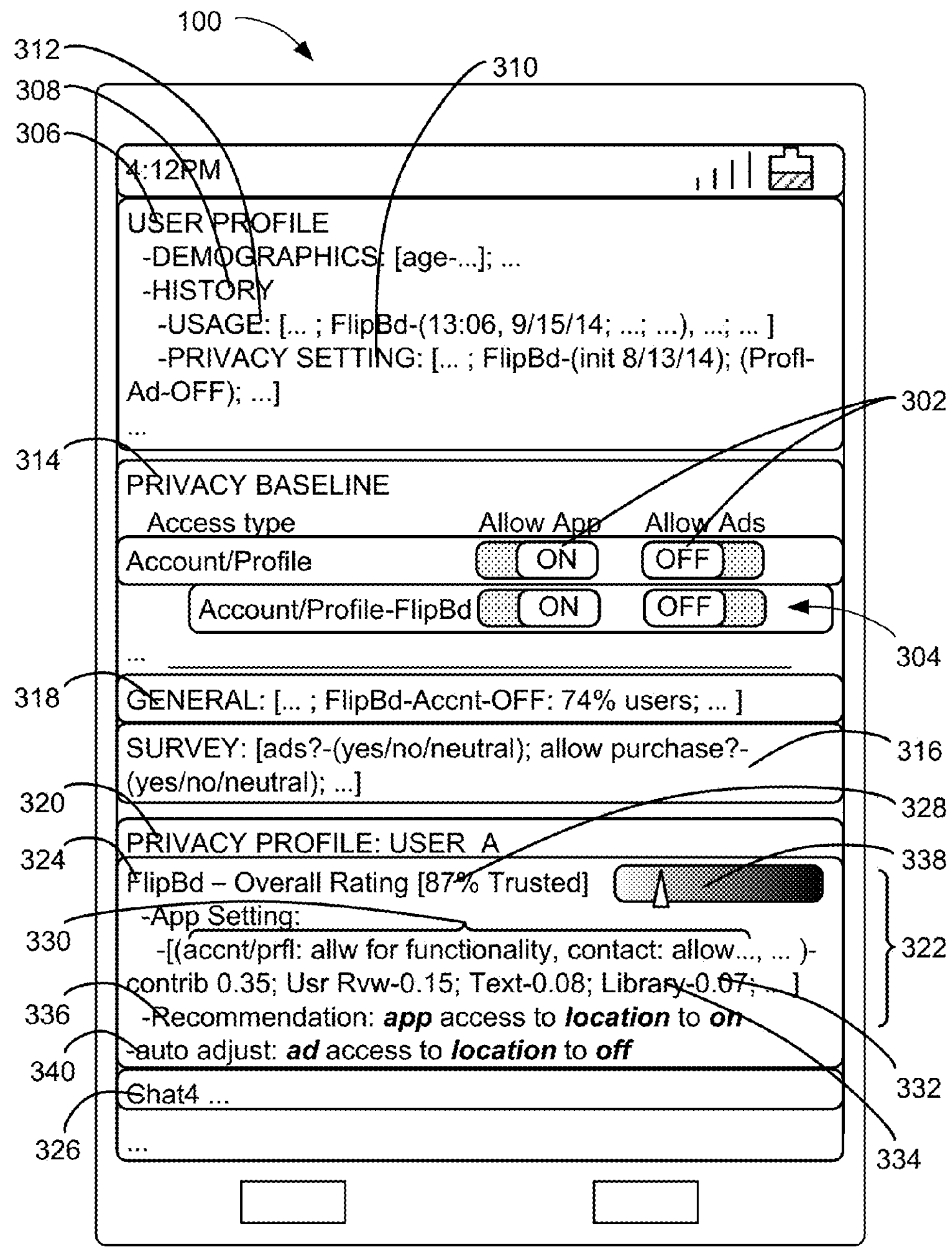
FIG. 3 is a further example of the display interface of the computing system.

Referring now to FIG. 3, therein is shown a further example of the display interface of the computing system 100. The computing system 100 can include a privacy setting input 302. The privacy setting input 302 is a control or a stimulus provided by the user 110 of FIG. 1 regarding access or control of data for one or more instances of the application 204 of FIG. 2. The privacy setting input 302 can include an initial setting or configuration for the first device 102 of FIG. 1, the second device 106 of FIG. 1, the application 204, or a combination thereof regarding privacy or protection of information regarding the user 110.

The privacy setting input 302 can include adjustment or update to the setting or configuration for the first device 102, the second device 106, the application 204, or a combination thereof. The privacy setting input 302 can be a response to a query or a stimulus from the computing system 100, an input for a mechanism controlling the configuration or the setting, or a combination thereof. The privacy setting input 302 can include an input from the user 110 through the first device 102 for controlling privacy for or protection of information regarding the user 110, including communication of relevant information or access to the relevant information by other devices or other end users.

The privacy setting input 302 can include a general setting, an application-specific privacy setting 304, or a combination thereof. The general setting can include a rule, setting, policy, or an input designation thereof affecting control of the privacy for more than one applications, such as for the application set 224 of FIG. 2. The general setting can be applicable based on the user 110, the usage context 222 of FIG. 2, the first device 102, the second device 106, the application 204, descriptive or related information thereof, or a combination thereof.

The application-specific privacy setting 304 is a rule, a setting, a policy, or an input designation thereof affecting control of the privacy for corresponding instance of the application 204. The application-specific privacy setting 304 can include a control or a stimulus provided by the user 110 for a specific corresponding instance of the application 204.

The computing system 100 can further include a user profile 306. The user profile 306 can include a description of the user 110. The user profile 306 can describe the user 110 relative to the computing system 100, the application 204, a use or an interaction thereof, or a combination thereof. The user profile 306 can include historical information, identification or descriptive information, or a combination thereof.

For example, the user profile 306 can include demographic information of the user 110, such as age or sex. Also for example, the user profile 306 can include identification information, such as name, address, title, qualification or license, status, or a combination thereof. Also for example, the user profile 306 can include user provided information, such as hobbies, preferences, settings, or a combination thereof. Also for example, the user profile 306 can include usage information for one or more instances of the application 204, such as user history 308.

The user history 308 can include usage information for one or more instances of the application 204 for the user 110. The user history 308 can include a location, a time, a duration, the usage context 222, an input, an output, accessed information, or a combination thereof for the usage of one or more instances of the application 204. The user history 308 can further include communicated information, communication parties, or a combination thereof. The user history 308 can further include previous instances of the privacy setting input 302 or the application-specific privacy setting 304 from the user 110 for one or more instances of the application 204.

The computing system 100 can use a privacy input pattern 310, a device-use pattern 312, or a combination thereof based on the user history 308. The privacy input pattern 310 is a connection in, a relationship between, or a repetitiveness in multiple instances of the privacy setting input 302 or information associated thereto. The privacy input pattern 310 can be based on the user history 308 or can be a result found within the user history 308.

The privacy input pattern 310 can further include a connection or a relationship between the usage context 222 and the corresponding instance of the privacy setting input 302 or a pattern thereof. The privacy input pattern 310 can further include a connection or a relationship between the preceding or subsequent event or occurrence and the corresponding instance of the privacy setting input 302 or a pattern thereof.

The device-use pattern 312 is a connection in, a relationship between, or a repetitiveness in multiple usage of the application 204 by the user 110. The device-use pattern 312 can describe a connection or a relationship between the usage context 222 and the corresponding instance of the usage of the application 204 by the user 110 or a pattern thereof.

The device-use pattern 312 can further include a connection or a relationship between the preceding or subsequent event or occurrence and the corresponding instance of the usage of the application 204 by the user 110 or a pattern thereof. The device-use pattern 312 can be based on the user history 308 or can be a result found within the user history 308.

The computing system 100 can further include a privacy baseline 314. The privacy baseline 314 is a standard or an initial representation of a level or a quality of protection or control for the information associated with the user 110. The privacy baseline 314 can include a widely known or well accepted level or quality of privacy protection. For example, the privacy baseline 314 can include an initial setting or configuration, an initial instance of the privacy setting input 302, or a combination thereof from the user 110.

Also for example, the privacy baseline 314 can include a widely known or well accepted status or rating for a communication counterpart, a categorization or a type for intended communication or sharable data, or a combination thereof along with corresponding level of protection or action. As a more specific example, the privacy baseline 314 can include a status or a rating, such as safe web site, a dangerous web site, a degree rating for a contact, a family member or a stranger, or a combination thereof commonly known or associated with acceptable level or degree of privacy or protection.

Also as a more specific example, the privacy baseline 314 can include a categorization or a type for the user's information, such as address or contact information, identification information, current location of the user 110, or a combination thereof commonly known or associated with acceptable level or degree of privacy or protection. Also as a more specific example, the privacy baseline 314 can include a method or an action for protection corresponding to the communication party or the intended communication content, such as an automatic filter or a block for the communication, a notice or a warning associated with sending the information, or a combination thereof.

The privacy baseline 314 can be based on a privacy survey 316, a general baseline 318, or a combination thereof. The privacy survey 316 can include a mechanism for determining the privacy setting input 302 or the privacy baseline 314 from the user 110. The privacy survey 316 can include a questionnaire or a predetermined set of questions, an interface for allowing separate or specific levels of control, or a combination thereof.

The privacy survey 316 can be used to receive the privacy setting input 302 or the privacy baseline 314 from the user 110. The general baseline 318 can include a representation of a widely known or well accepted status or rating for protecting privacy or controlling communication.

The general baseline 318 can include a status or a rating of the communication counterpart, a categorization or a type for the user's information, a method or an action for protection, or a combination thereof common across various different groupings. The general baseline 318 can be for commonalities for majority or significant number of end-users, common across end users similar to the user 110, across multiple different instances of the application 204, across applications similar to the application 204, or a combination thereof.

The computing system 100 can further include a user-specific privacy profile 320. The user-specific privacy profile 320 is a description or a representation of controls, settings, details thereof, or a combination thereof regarding information associated with a specific end-user. The user-specific privacy profile 320 can include controls, settings, configurations, or a combination thereof for the user 110.

The user-specific privacy profile 320 can be based on a heterogeneous privacy indicator utilizing multiple sources including sources independent of the manufacturer, the developer, the seller, or a combination thereof for the application 204 to determine appropriate privacy protection and communication control. The user-specific privacy profile 320 can be specific to one or a set of devices, such as one or the set of devices belonging to or corresponding to the user 110. The user-specific privacy profile 320 can be for the application set 224 or a portion therein.

The user-specific privacy profile 320 can include scenarios, conditions, accessing parties, intended information, or a combination thereof subject to control or protection desired by or appropriate for the user 110. The user-specific privacy profile 320 can further include actions or responses corresponding to the scenarios, the conditions, the accessing parties, the intended information, or a combination thereof as desired by or appropriate for the user 110. The user-specific privacy profile 320 can further include a quantification of an affinity, a comfort level, a rating, or a combination thereof for the user 110 corresponding to potential communication party, intended content, desired responses or actions, or a combination thereof.

The user-specific privacy profile 320 can include an application privacy profile 322. The application privacy profile 322 is a description or a representation of controls, settings, details thereof, or a combination thereof regarding information associated with a specific end-user and a specific instance of the application 204.

The user-specific privacy profile 320 can include multiple instances of the application privacy profile 322 for the user 110, associated device, the application set 224, or a combination thereof. For example, the user-specific privacy profile 320 can include a first privacy profile 324 for the application privacy profile 322 corresponding to the first executable program 226 of FIG. 2, a second privacy profile 326 for the application privacy profile 322 corresponding to the second executable program 228 of FIG. 2, or a combination thereof associated with the first device 102, with the user 110, or a combination thereof.

The application privacy profile 322 can include an overall rating 328, an access privacy categorization 330, a category-specific rating 332, a category-specific access 334, or a combination thereof. The overall rating 328 is a comprehensive characterization or representation of an aspect of privacy for the corresponding application. The overall rating 328 can include a score, a level, a type, a percentage, or a combination thereof for characterizing or representing aspects of the application 204 associated with privacy.

The overall rating 328 can be based on a rating system or method predetermined by the computing system 100. For example, the overall rating 328 can be calculated or generated based communicating parties, such as server or receiver, type of information shared, such as the user profile 306 or location information, method of communication, such as Internet or directly between end-users, mechanisms or methods available to the user 110 for controlling communication or protecting privacy, incoming information, or a combination thereof.

The access privacy categorization 330 is one or a set of fields or aspects of communication for the corresponding application. The access privacy categorization 330 can include categories of communication or data access utilized or available for the application 204. For example, the access privacy categorization 330 can include categories corresponding to communications regarding the user profile 306, location information, contact or communication history information, access to the Internet, advertisements, a portion therein, or a combination thereof.

The access privacy categorization 330 can be based on categories, fields, a system or a set thereof, or a combination thereof predetermined by the computing system 100. The access privacy categorization 330 can represent the categories or the fields corresponding to the application 204 or utilized by the application 204. The access privacy categorization 330 can further represent the categories or the fields available to the user 110 for control through the application 204. The access privacy categorization 330 can correspond to one or more specific instances of the function 202 of FIG. 2 for the application 204.

The category-specific rating 332 is a characterization or representation of a degree of control or privacy corresponding to a specific instance of the access privacy categorization 330 for the application 204. The category-specific rating 332 can be similar to the overall rating 328 but for a specific instance of the access privacy categorization 330. The category-specific rating 332 can include a score or a rating for a level of exposure, a level of control or a protection, a type of shared information, a communication party, a perceived or an actual use of the information, or a combination thereof corresponding to the access privacy categorization 330.

The category-specific access 334 is an action or an execution of the application 204 regarding a specific instance of the access privacy categorization 330. The category-specific access 334 can include one or more instances of the function 202 used in communicating information according to an instance of the access privacy categorization 330. The category-specific access 334 can include a feature or an operation of the application 204 regarding protection or control of the user's private information. For example, the category-specific access 334 can include the function 202, the feature, the operation, or a combination thereof for sending or receiving information.

As a more specific example, the category-specific access 334 can include a function call, a routine, a protocol, a tool, or a combination thereof in the API for implementing wireless communication, such as WiFi or cellular communication, wired communication, an interface function for a specific circuitry, such as circuitry functioning as part of global positioning system (GPS) or a memory circuitry, or a combination thereof. Also as a more specific example, the category-specific access 334 can include a function call, a routine, a protocol, a tool, or a combination thereof accessing the periphery access set 210 of FIG. 2, associated with specific content or communication party, or a combination thereof.

The computing system 100 can determine the category-specific access 334 for the application 204. The computing system 100 can further notify the user 110 regarding the category-specific access 334, control the category-specific access 334, or a combination thereof for controlling communication and protecting user's private information. Details regarding the category-specific access 334 are discussed below.

The user-specific privacy profile 320 can include an application privacy recommendation 336. The application privacy recommendation 336 is a notification intended for the user 110 regarding the control of communication for protecting information associated with the user 110.

For example, the application privacy recommendation 336 can include a warning for a possible release or access of unintended information by an unintended end-user. Also for example, the application privacy recommendation 336 can include a discrepancy in user's settings or actions involving different fields, recipients, functions, applications, or a combination thereof.

Also for example, the application privacy recommendation 336 can include a specific function or behavior of the application 204 associated with communication or privacy estimated to be of interested to the user 110. Also for example, the application privacy recommendation 336 can include a recommendation for the privacy setting input 302 or the application-specific privacy setting 304 for changing a setting or a configuration to improve control of communication or protection of access for information associated with the user 110. Also for example, the application privacy recommendation 336 can recommend an existing instance of the application 204, a new instance of the application 204 for download, or a combination thereof for performing the objective, for replacing a specific application, or a combination thereof.

The application privacy recommendation 336 can be specific for the user 110. The application privacy recommendation 336 can be based on the user profile 306, the privacy setting input 302, the privacy baseline 314, the user-specific privacy profile 320, or a combination thereof.

The application privacy recommendation 336 can further be based on a heterogeneous privacy indicator, such as the user-specific privacy profile 320, utilizing multiple independent sources to analyze the application 204 with respect to privacy. The application privacy recommendation 336 can be based on the heterogeneous privacy indicator using more than the application description 214 of FIG. 2 or other information originating from party or entity also providing the application 204, such as a developer, a distributor, a seller, or a combination thereof.

The computing system 100 can further include a graphical risk summary 338, a privacy setting adjustment 340, or a combination thereof. The graphical risk summary 338 can include a visual representation of communication control or privacy protection.

The graphical risk summary 338 can use colors, shapes, relative locations or placements thereof, or a combination thereof to visually represent the level or quality of communication control or privacy protection. The graphical risk summary 338 can be specific to expectations or desires of the user 110, as estimated based on the user profile 306, the privacy setting input 302, the privacy baseline 314, the user-specific privacy profile 320, or a combination thereof.

The graphical risk summary 338 can describe or represent one or more instances of the application 204, such as for the application set 224. The graphical risk summary 338 can represent the communication control or the privacy protection according to various categories, such as the access privacy categorization, various functions, various conditions or scenarios, or a combination thereof.

The privacy setting adjustment 340 can include an action, an operation, an implementation, or a combination thereof for changing or updating the setting or configuration for controlling communication or protecting privacy. The privacy setting adjustment 340 can include an action, an operation, an implementation, or a combination thereof initiated and implemented by the computing system 100 with or without input or designation from the user 110.

The privacy setting adjustment 340 can include automatic and dynamic adjustments to the user-specific privacy profile 320. The privacy setting adjustment 340 can include the privacy setting input 302 or an analogous adjustment made by the computing system 100.

Figure 4:
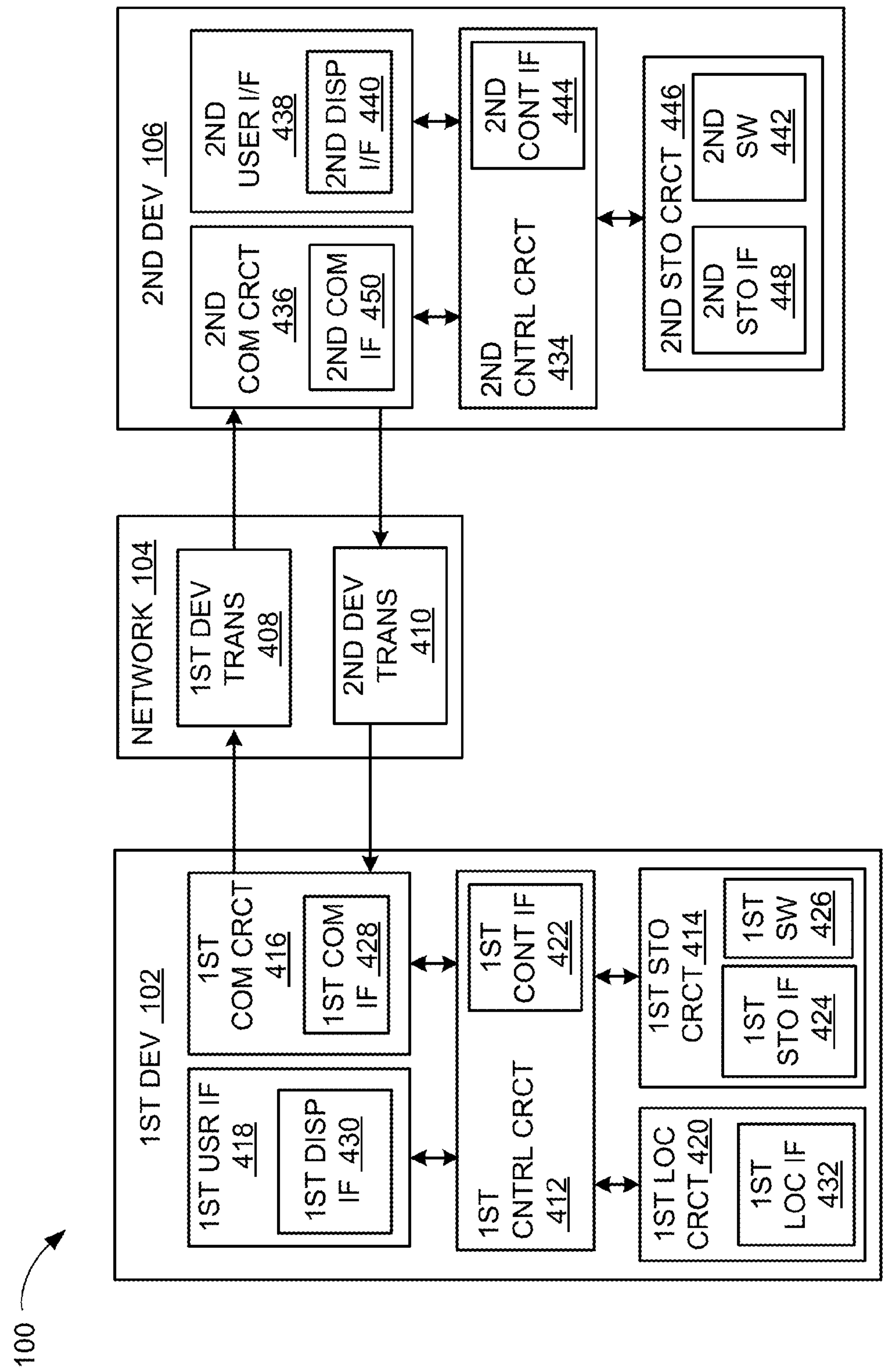
FIG. 4 is an exemplary block diagram of the computing system.

Referring now to FIG. 4 therein is shown an exemplary block diagram of the computing system 100. The computing system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the computing system 100 is shown with the first device 102 as a client device, although it is understood that the computing system 100 can have the first device 102 as a different type of device. For example, the first device 102 can be a relay device.

Also for illustrative purposes, the computing system 100 is shown with the second device 106 as a mobile device, a computing device, an appliance, or a combination thereof, although it is understood that the computing system 100 can have the second device 106 as a different type of device.

For brevity of description in this embodiment of the present invention, the first device 102 will be described as a client device and the second device 106 will be described as a mobile device, a computing device, an appliance, a wearable device, or a combination thereof. Embodiments of the present invention are not limited to this selection for the type of devices. The selection is an example of the embodiments of the present invention.

The first device 102 can include a first control circuit 412, a first storage circuit 414, a first communication circuit 416, a first user interface 418, a location circuit 420, or a combination thereof. The first control circuit 412 can include a first control interface 422. The first control circuit 412 can execute a first software 426 to provide the intelligence of the computing system 100. The first control circuit 412 can be implemented in a number of different manners.

For example, the first control circuit 412 can be a processor, an embedded processor, a microprocessor, a hardware control logic, a hardware finite state machine (FSM), a digital signal processor (DSP), or a combination thereof. As a more specific example, the first control circuit 412 can include a processor, an embedded processor, a microprocessor, a hardware control logic, a hardware FSM, a DSP, or a combination thereof configured generally to execute or implement any software or instruction. Also as a more specific example, the first control circuit 412 can include circuitry, such as a hardware FSM, a DSP, FPGA, digital logic, or a combination thereof configured specifically in hardware to execute or implement one or more functions.

The first control interface 422 can be used for communication between the first control circuit 412 and other functional circuits in the first device 102. The first control interface 422 can also be used for communication that is external to the first device 102.

The first control interface 422 can receive information from the other functional circuits or from external sources, or can transmit information to the other functional circuits or to external destinations. The external sources and the external destinations refer to sources and destinations external to the first device 102.

The first control interface 422 can be implemented in different ways and can include different implementations depending on which functional circuits or external circuits are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location circuit 420 can generate a location information, a heading, an acceleration, and a speed of the first device 102, as examples. The location circuit 420 can be implemented in many ways. For example, the location circuit 420 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The location circuit 420 can include a location interface 432. The location interface 432 can be used for communication between the location circuit 420 and other functional circuits in the first device 102. The location interface 432 can also be used for communication that is external to the first device 102.

The location interface 432 can receive information from the other functional circuits or from external sources, or can transmit information to the other functional circuits or to external destinations. The external sources and the external destinations refer to sources and destinations external to the first device 102.

The location interface 432 can include different implementations depending on which functional circuits or external circuits are being interfaced with the location circuit 420. The location interface 432 can be implemented with technologies and techniques similar to the implementation of the first control interface 422.

The first storage circuit 414 can store the first software 426. The first storage circuit 414 can also store relevant information, such as advertisements, biometric information, points of interest (POIs), navigation routing entries, reviews/ratings, feedback, or any combination thereof.

The first storage circuit 414 can be a volatile memory, a nonvolatile memory, an internal memory, an external memory, or a combination thereof. For example, the first storage circuit 414 can be a nonvolatile storage such as non-volatile random access memory (NVRAM), Flash memory, disk storage, or a volatile storage such as static random access memory (SRAM).

The first storage circuit 414 can include a first storage interface 424. The first storage interface 424 can be used for communication between the location circuit 420 and other functional circuits in the first device 102. The first storage interface 424 can also be used for communication that is external to the first device 102.

The first storage interface 424 can receive information from the other functional circuits or from external sources, or can transmit information to the other functional circuits or to external destinations. The external sources and the external destinations refer to sources and destinations external to the first device 102.

The first storage interface 424 can include different implementations depending on which functional circuits or external circuits are being interfaced with the first storage circuit 414. The first storage interface 424 can be implemented with technologies and techniques similar to the implementation of the first control interface 422.

The first communication circuit 416 can enable external communication to and from the first device 102. For example, the first communication circuit 416 can permit the first device 102 to communicate with the second device 106 of FIG. 1, an attachment, such as a peripheral device or a notebook computer, and the network 104.

The first communication circuit 416 can also function as a communication hub allowing the first device 102 to function as part of the network 104 and not limited to be an end point or terminal circuit to the network 104. The first communication circuit 416 can include active and passive components, such as microelectronics or an antenna, for interaction with the network 104.

The first communication circuit 416 can include a first communication interface 428. The first communication interface 428 can be used for communication between the first communication circuit 416 and other functional circuits in the first device 102. The first communication interface 428 can receive information from the other functional circuits or can transmit information to the other functional circuits.

The first communication interface 428 can include different implementations depending on which functional circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a sensor, a signal generator, or any combination thereof to provide data and communication inputs.

The first user interface 418 can include a first display interface 430. The first display interface 430 can include a display, a projector, a video screen, a speaker, or any combination thereof.

The first control circuit 412 can operate the first user interface 418 to display information generated by the computing system 100. The first control circuit 412 can also execute the first software 426 for the other functions of the computing system 100, including receiving location information from the location circuit 420. The first control circuit 412 can further execute the first software 426 for interaction with the network 104 via the first communication circuit 416.

The second device 106 can be optimized for implementing the various embodiments in a multiple device embodiment with the first device 102. The second device 106 can provide the additional or higher performance processing power compared to the first device 102. The second device 106 can include a second control circuit 434, a second communication circuit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control circuit 434 can execute a second software 442 to provide the intelligence of the second device 106 of the computing system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the computing system 100, including operating the second communication circuit 436 to communicate with the first device 102 over the network 104.

The second control circuit 434 can be implemented in a number of different manners. For example, the second control circuit 434 can be a processor, an embedded processor, a microprocessor, a hardware control logic, a hardware finite state machine (FSM), a digital signal processor (DSP), or a combination thereof. As a more specific example, the second control circuit 434 can include a processor, an embedded processor, a microprocessor, a hardware control logic, a hardware FSM, a DSP, or a combination thereof configured generally to execute or implement any software or instruction. Also as a more specific example, the second control circuit 434 can include circuitry, such as a hardware FSM, a DSP, FPGA, digital logic, or a combination thereof configured specifically in hardware to execute or implement one or more functions.

The second control circuit 434 can include a second controller interface 444. The second controller interface 444 can be used for communication between the second control circuit 434 and other functional circuits in the second device 106. The second controller interface 444 can also be used for communication that is external to the second device 106.

The second controller interface 444 can receive information from the other functional circuits or from external sources, or can transmit information to the other functional circuits or to external destinations. The external sources and the external destinations refer to sources and destinations external to the second device 106.

The second controller interface 444 can be implemented in different ways and can include different implementations depending on which functional circuits or external circuits are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the relevant information, such as advertisements, biometric information, points of interest, navigation routing entries, reviews/ratings, feedback, or any combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the computing system 100 is shown with the second storage circuit 446 as a single hierarchy storage system, although it is understood that the computing system 100 can have the second storage circuit 446 in a different configuration. For example, the second storage circuit 446 can be formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 can be a nonvolatile storage such as non-volatile random access memory (NVRAM), Flash memory, disk storage, or a volatile storage such as static random access memory (SRAM).

The second storage circuit 446 can include a second storage interface 448. The second storage interface 448 can be used for communication between the location circuit 420 and other functional circuits in the second device 106. The second storage interface 448 can also be used for communication that is external to the second device 106.

The second storage interface 448 can receive information from the other functional circuits or from external sources, or can transmit information to the other functional circuits or to external destinations. The external sources and the external destinations refer to sources and destinations external to the second device 106.

The second storage interface 448 can include different implementations depending on which functional circuits or external circuits are being interfaced with the second storage circuit 446. The second storage interface 448 can be implemented with technologies and techniques similar to the implementation of the second controller interface 444.

The second communication circuit 436 can enable external communication to and from the second device 106. For example, the second communication circuit 436 can permit the second device 106 to communicate with the first device 102 over the network 104.

The second communication circuit 436 can also function as a communication hub allowing the second device 106 to function as part of the network 104 and not limited to be an end point or terminal circuits to the network 104. The second communication circuit 436 can include active and passive components, such as microelectronics or an antenna, for interaction with the network 104.

The second communication circuit 436 can include a second communication interface 450. The second communication interface 450 can be used for communication between the second communication circuit 436 and other functional circuits in the second device 106. The second communication interface 450 can receive information from the other functional circuits or can transmit information to the other functional circuits.

The second communication interface 450 can include different implementations depending on which functional circuits are being interfaced with the second communication circuit 436. The second communication interface 450 can be implemented with technologies and techniques similar to the implementation of the second controller interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The computing system 100 can be executed by the first control circuit 412, the second control circuit 434, or a combination thereof.

For illustrative purposes, the second device 106 is shown with the partition having the second user interface 438, the second storage circuit 446, the second control circuit 434, and the second communication circuit 436, although it is understood that the second device 106 can have a different partition. For example, the second software 442 can be partitioned differently such that some or all of its function can be in the second control circuit 434 and the second communication circuit 436. Also, the second device 106 can include other functional circuits not shown in FIG. 5 for clarity.

The functional circuits in the first device 102 can work individually and independently of the other functional circuits. The first device 102 can work individually and independently from the second device 106 and the network 104.

The functional circuits in the second device 106 can work individually and independently of the other functional circuits. The second device 106 can work individually and independently from the first device 102 and the network 104.

For illustrative purposes, the computing system 100 is described by operation of the first device 102 and the second device 106. It is understood that the first device 102 and the second device 106 can operate any of the functions or instructions of the computing system 100. For example, the first device 102 is described to operate the location circuit 420, although it is understood that the second device 106 can also operate the location circuit 420.

Figure 5:
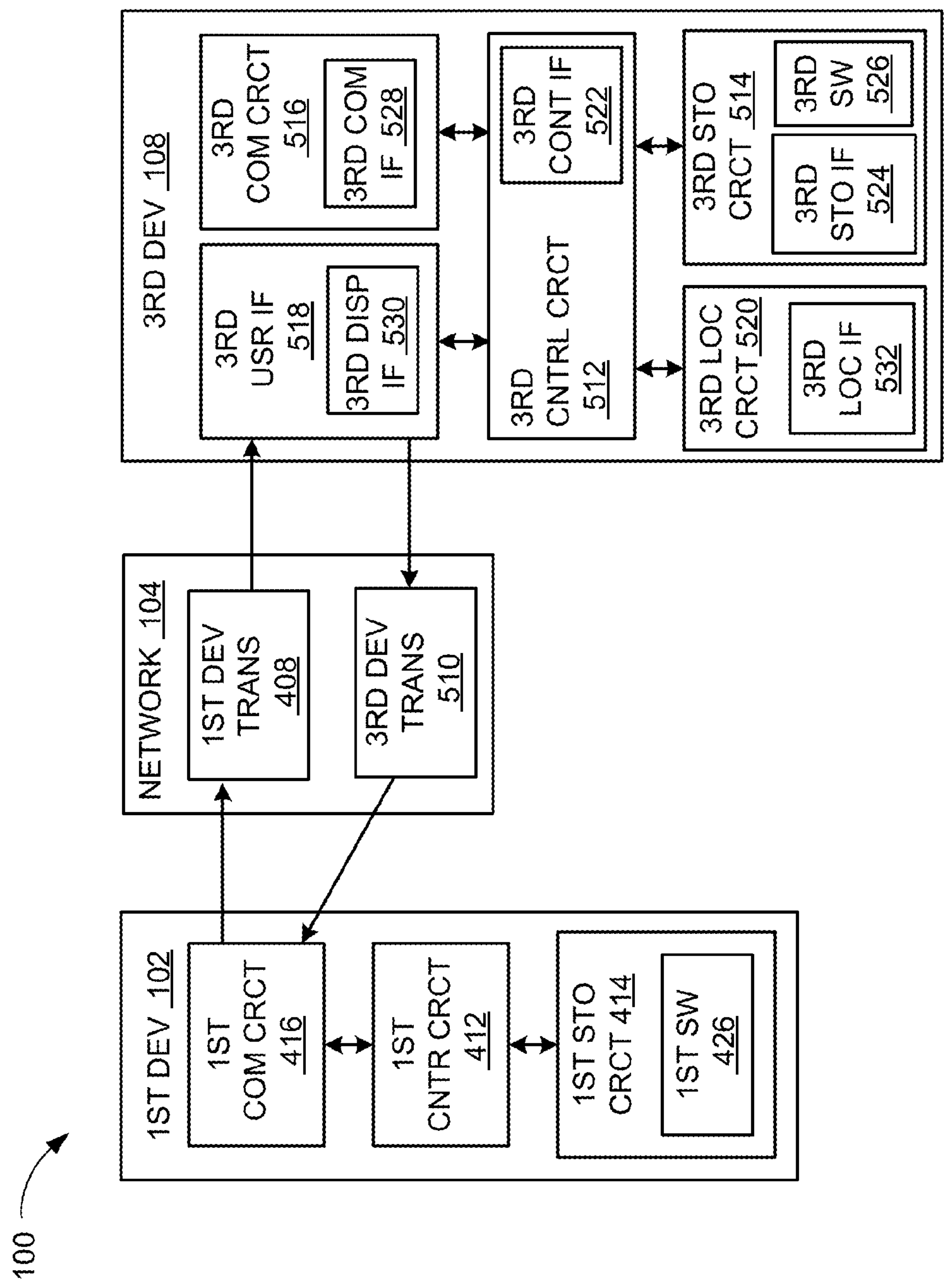
FIG. 5 is a further exemplary block diagram of the computing system.

Referring now to FIG. 5, therein is shown a further exemplary block diagram of the computing system 100. Along with the first device 102 and the second device 106 of FIG. 4, the computing system 100 can include the third device 108. The first device 102 can send information in the first device transmission 408 over the network 104 to the third device 108. The third device 108 can send information in a third device transmission 510 over the network 104 to the first device 102, the second device 106, or a combination thereof.

For illustrative purposes, the computing system 100 is shown with the third device 108 as a client device, although it is understood that the computing system 100 can have the third device 108 as a different type of device. For example, the third device 108 can be a server.

Also for illustrative purposes, the computing system 100 is shown with the first device 102 communicating with the third device 108. However, it is understood that the second device 106, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control circuit 512, a third storage circuit 514, a third communication circuit 516, a third user interface 518, a third location circuit 520, or a combination thereof. The third control circuit 512 can include a third control interface 522. The third control circuit 512 can execute a third software 526 to provide the intelligence of the computing system 100.

The third control circuit 512 can be implemented in a number of different manners. For example, the third control circuit 512 can be a processor, an application specific integrated circuit (ASIC) an embedded processor, a microprocessor, a hardware control logic, a hardware finite state machine (FSM), a digital signal processor (DSP), or a combination thereof. As a more specific example, the third control circuit 512 can include a processor, an embedded processor, a microprocessor, a hardware control logic, a hardware FSM, a DSP, or a combination thereof configured generally to execute or implement any software or instruction. Also as a more specific example, the third control circuit 512 can include circuitry, such as a hardware FSM, a DSP, FPGA, digital logic, or a combination thereof configured specifically in hardware to execute or implement one or more functions.

The third control interface 522 can be used for communication between the third control circuit 512 and other functional circuits in the third device 108. The third control interface 522 can also be used for communication that is external to the third device 108.

The third control interface 522 can receive information from the other functional circuits or from external sources, or can transmit information to the other functional circuits or to external destinations. The external sources and the external destinations refer to sources and destinations external to the third device 108.

The third control interface 522 can be implemented in different ways and can include different implementations depending on which functional circuits or external circuits are being interfaced with the third control interface 522. For example, the third control interface 522 can be implemented with a pressure sensor, an inertial sensor, a microelectromechanical system (MEMS), optical circuitry, waveguides, wireless circuitry, wireline circuitry, or a combination thereof.

The third storage circuit 514 can store the third software 526. The third storage circuit 514 can also store the relevant information, such as data representing incoming images, data representing previously presented image, sound files, or a combination thereof.

The third storage circuit 514 can be a volatile memory, a nonvolatile memory, an internal memory, an external memory, or a combination thereof. For example, the third storage circuit 514 can be a nonvolatile storage such as non-volatile random access memory (NVRAM), Flash memory, disk storage, or a volatile storage such as static random access memory (SRAM). Also for example, the third storage circuit 514 can be distribution of storage elements, multiple hierarchy storage system including different levels of caching, main memory, rotating media, or off-line storage, or a combination thereof.

The third storage circuit 514 can include a third storage interface 524. The third storage interface 524 can be used for communication between the third storage circuit 514 and other functional circuits in the third device 108. The third storage interface 524 can also be used for communication that is external to the third device 108.

The third storage interface 524 can receive information from the other functional circuits or from external sources, or can transmit information to the other functional circuits or to external destinations. The external sources and the external destinations refer to sources and destinations external to the third device 108.

The third storage interface 524 can include different implementations depending on which functional circuits or external circuits are being interfaced with the third storage circuit 514. The third storage interface 524 can be implemented with technologies and techniques similar to the implementation of the third control interface 522.

The third communication circuit 516 can enable external communication to and from the third device 108. For example, the third communication circuit 516 can permit the third device 108 to communicate with the second device 106, the first device 102, a different device, an attachment, such as a peripheral device or a desktop computer, the network 104, or a combination thereof.

The third communication circuit 516 can also function as a communication hub allowing the third device 108 to function as part of the network 104 and not limited to be an end point or terminal circuit to the network 104. The third communication circuit 516 can include active and passive components, such as microelectronics or an antenna, for interaction with the network 104.

The third communication circuit 516 can include a baseband device or component, a modem, a digital signal processor, or a combination thereof for transmitting, formatting, receiving, detecting, decoding, further processing, or a combination thereof for communication signals. The third communication circuit 516 can include one or more portions for processing the voltages, the currents, the digital information, or a combination thereof, such as an analog-to-digital converter, a digital-to-analog converter, a filter, an amplifier, a processor-type circuitry, or a combination thereof. The third communication circuit 516 can further include one or more portions for storing information, such as cache or RAM memory, registers, or a combination thereof.

The third communication circuit 516 can include a third communication interface 528. The third communication interface 528 can be used for communication between the third communication circuit 516 and other functional circuits in the third device 108. The third communication interface 528 can receive information from the other functional circuits or can transmit information to the other functional circuits.

The third communication interface 528 can include different implementations depending on which functional circuits are being interfaced with the third communication circuit 516. The third communication interface 528 can be implemented with technologies and techniques similar to the implementation of the third control interface 522.

The third user interface 518 allows a user (not shown) to interface and interact with the third device 108. The third user interface 518 can include an input device and an output device. Examples of the input device of the third user interface 518 can include a keypad, a touchpad, soft-keys, a keyboard, a microphone, an infrared sensor for receiving remote signals, or any combination thereof to provide data and communication inputs.

The third user interface 518 can include a third display interface 530. The third display interface 530 can include an output device. The third display interface 530 can include a display, a projector, a video screen, a speaker, or any combination thereof.

The third control circuit 512 can operate the third user interface 518 to display information generated by the computing system 100. The third control circuit 512 can also execute the third software 526 for the other functions of the computing system 100, including receiving location information from the third location circuit 520. The third control circuit 512 can further execute the third software 526 for interaction with the network 104 via the third communication circuit 516.

The third location circuit 520 can generate location information, current heading, current acceleration, and current speed of the third device 108, as examples. The third location circuit 520 can be implemented in many ways. For example, the third location circuit 520 can function as at least a part of the global positioning system, an inertial computing system, a cellular-tower location system, a pressure location system, or any combination thereof. Also, for example, the third location circuit 520 can utilize components such as an accelerometer or GPS receiver.

The third location circuit 520 can include a third location interface 532. The third location interface 532 can be used for communication between the third location circuit 520 and other functional circuits in the third device 108. The third location interface 532 can also be used for communication external to the third device 108.

The third location interface 532 can receive information from the other functional circuits or from external sources, or can transmit information to the other functional circuits or to external destinations. The external sources and the external destinations refer to sources and destinations external to the third device 108.

The third location interface 532 can include different implementations depending on which functional circuits or external circuits are being interfaced with the third location circuit 520. The third location interface 532 can be implemented with technologies and techniques similar to the implementation of the third control circuit 512.

For illustrative purposes, the third device 108 is shown with the partition having the third user interface 518, the third storage circuit 514, the third control circuit 512, and the third communication circuit 516, although it is understood that the third device 108 can have a different partition. For example, the third software 526 can be partitioned differently such that some or all of its function can be in the third control circuit 512 and the third communication circuit 516. Also, the third device 108 can include other functional circuits not shown in FIG. 5 for clarity.

The functional circuits in the third device 108 can work individually and independently of the other functional circuits. The third device 108 can work individually and independently from the first device 102, the second device 106, and the network 104.

For illustrative purposes, the computing system 100 is described by operation of the first device 102 and the third device 108. It is understood that the first device 102, the second device 106, and the third device 108 can operate any of the functions or instructions of the computing system 100.

Figure 6:
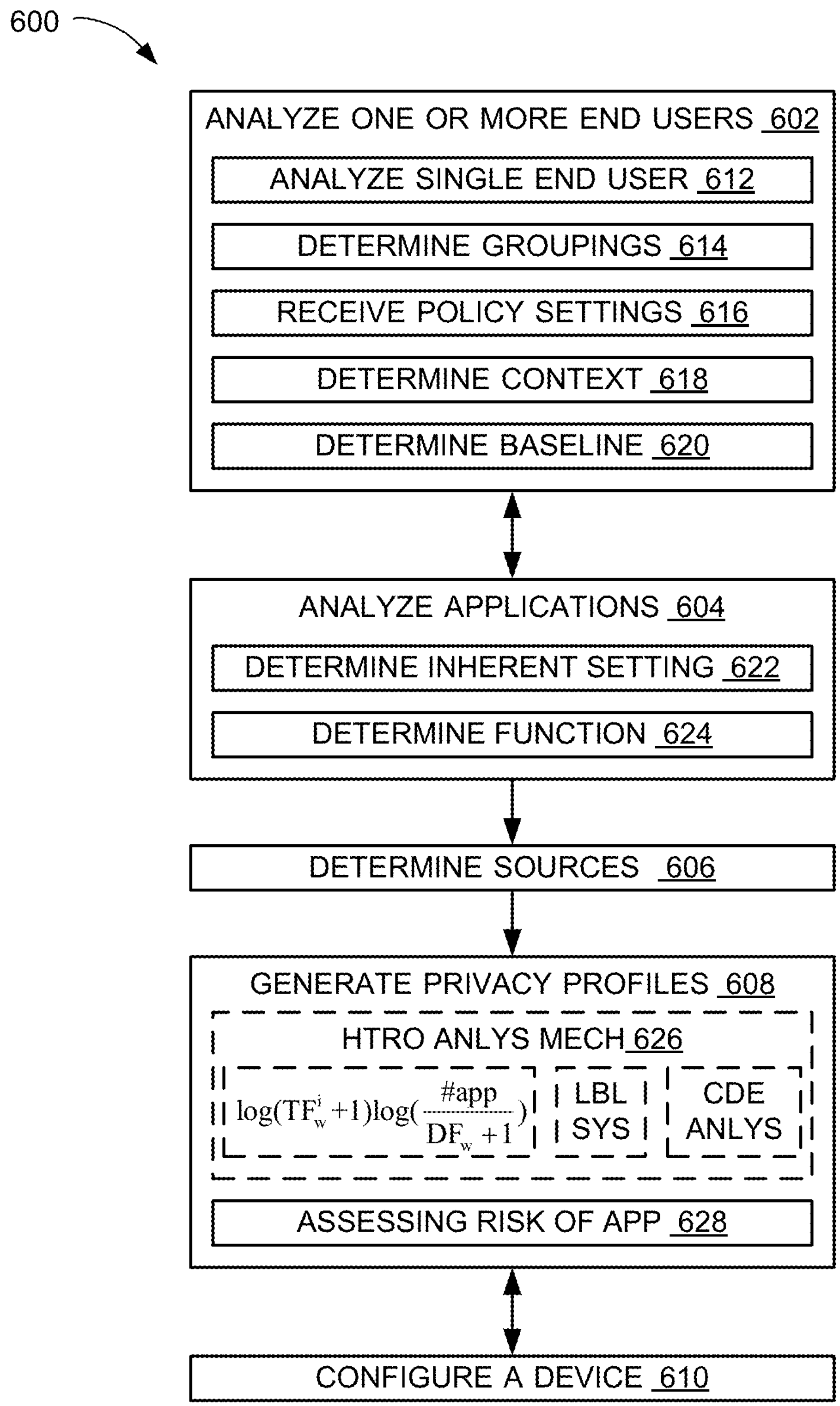
FIG. 6 is an exemplary flow chart for representing the computing system of FIG. 1.

Referring now to FIG. 6, therein is shown an exemplary flow chart 600 for representing the computing system 100 of FIG. 1. The computing system 100 can utilize one or more of the user interfaces, communication circuits, control circuits, location circuits, storage circuits, or a combination thereof as illustrated in FIG. 4 or FIG. 5 and described above to implement one or more functions, instructions, steps, or a combination thereof described below.

For example, the computing system 100 can use the first user interface 418 of FIG. 4, the second user interface 438 of FIG. 4, the third user interface 518 of FIG. 5, the first communication circuit 416 of FIG. 4, the second communication circuit 436 of FIG. 4, the third communication circuit 516 of FIG. 5, the first control circuit 412 of FIG. 4, the second control circuit 434 of FIG. 4, the third control circuit 512 of FIG. 5, the first location circuit 420 of FIG. 4, the third location circuit 520 of FIG. 5, the first storage unit 414 of FIG. 4, the second storage unit 446 of FIG. 4, the third storage unit 514 of FIG. 5, or a combination thereof to implement the first software 426 of FIG. 4, the second software 442 of FIG. 4, the third software 526 of FIG. 5, or a combination thereof. The first software 426, the second software 442, the third software 526, or a combination thereof can include the functions, the instructions, the steps, or a combination thereof described below.

The computing system 100 can include the functions, the instructions, the steps, or a combination thereof for analyzing one or more end users as represented in a box 602, analyzing one or more applications as represented in a box 604, determining sources for policy information as represented in a box 606, generating one or more privacy profiles as represented in a box 608, configuring a device according to the one or more privacy profiles as represented in a box 610, or a combination thereof.

The computing system 100 can analyze one or more end users, including the user 110 of FIG. 1, the remote operator 112 of FIG. 1, or a combination thereof as represented in the box 602. The computing system 100 can include and execute the function, the instruction, the step, or a combination thereof corresponding to analyzing the one or more end users as represented in the box 602.

The computing system 100 can analyze the one or more end users based on automatically determining the similarity of different users, such as from dynamic user profiling, and the similarity of different apps, such as from analyzing the applications as represented in the box 604, or a combination thereof. The computing system 100 can combine the application similarity analytics and user similarity analytics for personalized application risk assessment using heterogeneous collaborative learning.

The computing system 100 can analyze the end users, the applications, or a combination thereof to generate the personalized risk score by leveraging the personalized collaborative learning techniques for risk analytics. The computing system 100 can analyze the end users, the applications, or a combination thereof to dynamically or adaptively change the risk based on the analysis.

The computing system 100 can analyze the one or more end users based on analyzing each of the one or more end users, determining groupings of end users, receiving policy settings, determining context, determining baseline, or a combination thereof. The computing system 100 can analyze the one or more end users based on analyzing each of the one or more end users as represented in a box 612, determining one or more groupings of end users as represented in a box 614, receiving policy settings as represented in a box 616, determining context as represented in a box 618, determining baseline as represented in a box 620, or a combination thereof.

The computing system 100 can analyze the one or more end users based on analyzing each of the one or more end users as represented in the box 612. The computing system 100 can identify and analyze individual end users, such as the user 110, the remote operator 112, or a combination thereof. The computing system 100 can further analyze a behavior, a usage or an interface of one or more device, or a combination thereof by the user 110, the remote operator 112, or a combination thereof.

The computing system 100 can analyze the individual end user in a variety of ways. For example, the computing system 100 can use the privacy survey 316 of FIG. 3, the user profile 306 of FIG. 3, or a combination thereof to identify information about the individual end users.

As a more specific example, the computing system 100 can determine the user profile 306, such as creating, storing, matching, accessing, or a combination thereof for an account or a membership. The computing system 100 can determine the user profile 306 based on receiving information from the user 110 through the first user interface 418, the second user interface 438, the third user interface 518, the first communication circuit 416, the second communication circuit 436, the third communication circuit 516, or a combination thereof.

Continuing with the specific example, the computing system 100 can determine the user profile 306 based on tracking and recording specific information from the end user or access of the computing system 100 by the end user. The computing system 100 can determine the user history 308 of FIG. 2 corresponding to the end user based on recording detail, such as time, date, duration, or a combination thereof, recording content or utilized information corresponding to the detail, such as communicated or generated information, or a combination thereof for accessing the computing system 100 or a device therein.

Also as a more specific example, the computing system 100 can determine the application set 224 of FIG. 2 corresponding to each of the end users. The computing system 100 can use the first communication circuit 416, the second communication circuit 436, the third communication circuit 516, the first control circuit 412, the second control circuit 434, the third control circuit 512, or a combination thereof to identify the instances of the application 204 existing on a device corresponding to the user 110 or the remote operator 112, such as the first device 102 of FIG. 1, the third device 108 of FIG. 1, or a combination thereof. The communication system 100 can similarly identify the instances of the application 204 downloaded, purchased, enabled or permitted for use, or a combination thereof for the corresponding end user.

Also as a more specific example, the computing system 100 can determine feedback information regarding one or more applications from each of the end users. The computing system 100 can determine the user feedback 220 of FIG. 2 from each of the end users addressing or regarding one or more instances of the application 204.

Also as a more specific example, the computing system 100 can process the privacy survey 316 of FIG. 2. The computing system 100 can communicate the privacy survey 316 to the end user, such as by displaying or audibly generating information, using the first user interface 418, the second user interface 438, the third user interface 518, the first communication circuit 416, the second communication circuit 436, the third communication circuit 516, or a combination thereof. The computing system 100 can further receive interactions, selections, communications, responses, or a combination thereof as the privacy setting input 302 of FIG. 3 from the end user for the privacy survey 316 using one or more of the interfaces, the communication circuits, or a combination thereof.

The computing system 100 can determine the user profile 306, process the privacy setting input 302, process the privacy survey 316, determine the application set 224, determine the feedback information, or a combination thereof using the first control circuit 412, the second control circuit 434, the third control circuit 512, or a combination thereof. The computing system 100 can use corresponding instances of the control interface to access the stored or communicated information.

The computing system 100 can use the control circuit to execute one or more instructions or manipulate the information. The computing system 100 can further store the accessed information, generated information or processing result, or a combination thereof, such as the application set 224, the user profile 306, the privacy survey 316 or results thereof, the privacy setting input 302, the feedback information, or a combination thereof, in the first storage unit 414, the second storage unit 446, the third storage unit 514, or a combination thereof.

The computing system 100 can determine one or more groupings of end users as represented in the box 614. The computing system 100 can use one or more of the communication circuits, the control interfaces, the storage interfaces, or a combination thereof to access information or details associated with each end user. For example, the computing system 100 can access the user profile 306, the user history 308, the application set 224, the responses to the privacy survey 316, the privacy setting input 302, the user feedback 220, a portion thereof, or a combination thereof corresponding to each of the end users.

The computing system 100 can use one or more of the communication circuits, the control circuits, or a combination thereof to compare the accessed information across multiple end users. For example, the computing system 100 can compare the user profile 306, the user history 308, the application set 224, the responses to the privacy survey 316, the privacy setting input 302, the user feedback 220, a portion thereof, or a combination thereof for the user 110 and the remote operator 112.

The computing system 100 can group the end users with common matches in the compared information. For example, the computing system 100 can group the end users with common information or similarities in the user profile 306, the user history 308, the application set 224, the responses to the privacy survey 316, the privacy setting input 302, the user feedback 220, a portion thereof, or a combination thereof. The computing system 100 can store the groupings in one or more of the storage circuits.

The computing system 100 can receive policy settings for controlling communication or protecting privacy as represented in the box 616. The computing system 100 can receive policy settings including the privacy setting input 302 or the application-specific privacy setting 304 of FIG. 3. For example, the computing system 100 can use the first user interface 418, the second user interface 438, the third user interface 518, the first communication circuit 416, the second communication circuit 436, the third communication circuit 516, or a combination thereof to receive a stimulus corresponding to the application-specific privacy setting 304 from the end user.

The computing system 100 can determine the application-specific privacy setting 304 based on identifying the stimulus from the end user. The computing system 100 can determine the application-specific privacy setting 304 as the privacy setting input 302 based on changes to the corresponding instance of the application 204, a value of a program counter, a change in a register value, a preceding prompt or communication from the computing system 100, or a combination thereof.

The computing system 100 can determine the application-specific privacy setting 304 for controlling the application 204, such as the first executable program 226 of FIG. 2 or the second executable program 228 of FIG. 2 associated with the corresponding end user. The application 204 can further include a hook, a notice, a function call, an interaction with a hosting device or an operating system, or a combination thereof for identifying and storing the stimulus from the end user regarding communication or privacy control.

The computing system 100 can further determine the application-specific privacy setting 304 based on accessing a configuration file stored and managed by the corresponding application. The computing system 100 can further determine the application-specific privacy setting 304 according to a protocol for communicating settings between a device or an operating system and the corresponding application.

The computing system 100 can determine context as represented in a box 618. The computing system 100 can determine the context based on determining the usage context 222 of FIG. 2. The computing system 100 can determine the usage context 222 based on accessing the parameter, the value, the data, the information, the source thereof, or a combination thereof.

The computing system 100 can use predetermined process or method, such as including a machine learning mechanism or a pattern recognition mechanism, a preset template or threshold, or a combination thereof to identify a parameter, a type, a category, a degree or magnitude, or a combination thereof as the usage context 222. The computing system 100 can determine the usage context 222 for representing the user 110 utilizing the first executable program 226, the second executable program 228, or a combination thereof.

The computing system 100 can determine the usage context 222 for the user 110 when the user 110 interacts with the application 204, such as accesses, interfaces with, controls, or a combination thereof for the application 204 within the application set 224. The computing system 100 can determine the usage context 222 based on accessing the parameter, the value, the data, the information, the source thereof, or a combination thereof predetermined to be associated or tied to the application 204.

The computing system 100 can further determine the usage context 222 based on accessing the parameter, the value, the data, the information, the source thereof, or a combination thereof occurring during the user's interaction with the application 204. The computing system 100 can further determine the usage context 222 based on accessing the parameter, the value, the data, the information, the source thereof, or a combination thereof occurring within a predetermined time duration of time from beginning or end of user's interaction with the application 204.

The computing system 100 can use the first control interface 422, the second control interface 444, the third control interface 522, or a combination thereof to access the parameter, the value, the data, the information, the source thereof, or a combination thereof according to cues, scenarios, methods, processes, predetermined by the computing system 100. The computing system 100 can further use the first control circuit 412, the second control circuit 434, the third control circuit 512, or a combination thereof to determine the usage context 222 based on the accessed information. The computing system 100 can further store the usage context 222 in the first storage circuit 414, the second storage circuit 446, the third storage circuit 514, or a combination thereof.

The computing system 100 can determine baseline as represented in a box 620. The computing system 100 can determine the baseline, such as an average, a medium, a starting point or an initial value, or a combination thereof, for controlling access of other remote users to information regarding the user 110.

The computing system 100 can determine the baseline based on determining the privacy baseline 314 of FIG. 3. The computing system 100 can determine the privacy baseline 314 for controlling communication for the user 110. The computing system 100 can determine the privacy baseline 314 can further determine the privacy baseline 314 for controlling communication across one or more applications within the application set 224 for the user 110.

The computing system 100 can determine the privacy baseline 314 in a variety of ways. For example, the computing system 100 can determine the privacy baseline 314 based on interacting with the user 110, based on settings or preferences of other remote operators or one or more groupings of end users, based on analyzing one or more instances of the application 204, or a combination thereof.

As a more specific example, the computing system 100 can determine the privacy baseline 314 using the privacy survey 316 of FIG. 3. The computing system 100 can use the privacy survey 316 to interact with the user 110. The computing system 100 can use the privacy survey 316 to receive levels, selections, settings, configurations, preferences, or a combination thereof from the user 110 regarding control of access or privacy levels. The computing system 100 can use the privacy survey 316 to query the user 110 for specifying desired level of control or restrictions, recipients or accessing parties to information, scenarios or conditions, types of information, information locations or communication mechanisms, physical locations of the user 110 or the accessing party, or a combination thereof.

Also as a more specific example, the computing system 100 can determine the privacy baseline 314 including the general baseline 318 of FIG. 3. The computing system 100 can determine the general baseline 318 based on settings, configurations, settings, or a combination thereof for the communication or access control or privacy control for multiple end users according to groupings determined as represented in the box 614. The computing system 100 can determine the general baseline 318 based on averaging the settings, the configurations, the settings, or a combination thereof for the control across the grouping.

Continuing with the more specific example, the computing system 100 can further determine the general baseline 318 based on the grouping with similarities or overlaps in the user profile 306 of FIG. 3 as the user 110, such as common demographics or usage information. The computing system 100 can include a predetermined ranking, method, process, or a combination thereof for evaluating similarities in user profiles across end users.

Continuing with the more specific example, the computing system 100 can based on the grouping with similarities or overlaps in the application set 224. The computing system 100 can include a predetermined ranking, method, process, categories, or a combination thereof for evaluating similarities in the application set 224 across end users.

The computing system 100 can determine the general baseline 318 as the settings, the configurations, the settings, or a combination thereof of the grouping of end users having similarities or associations to the user 110 as discussed above. The computing system 100 can set the general baseline 318 as the privacy baseline 314 of the user 110. The computing system 100 can determine the privacy baseline 314 of the user 110 based on settings or configurations of the users within the groupings, such as based on the closest matching end user or based on averaging within the group.

The computing system 100 can use one or more of the user interfaces, the communication circuits, or a combination thereof for the first device 102, the second device 106, the third device 108, or a combination thereof to implement the privacy survey 316 and interact with the user 110. The computing system 100 can similarly access the privacy survey 316 stored in one or more of the storage circuits using one or more of the control interfaces, the communication circuits, the storage circuits, or a combination thereof for the first device 102, the second device 106, the third device 108, or a combination thereof.

The computing system 100 can access the configurations, the settings, or a combination thereof for the communication or access control or privacy control across multiple end users using one or more of the control interfaces, the communication circuits, the storage circuits, or a combination thereof for the first device 102, the second device 106, the third device 108, or a combination thereof. The computing system 100 can use one or more instances of the control circuits for the first device 102, the second device 106, the third device 108, or a combination thereof to determine the general baseline 318. The computing system 100 can store the resulting instance of the privacy baseline 314 in one or more of the storage circuits for the first device 102, the second device 106, the third device 108, or a combination thereof.

After analyzing one or more end users, the control flow can pass to analyze one or more applications as represented in the box 604. The control flow by having a processing result as an output from a function or a portion of a circuitry to an input to another function or a different portion of a circuitry. The control flow can further pass by storing the processing result at a location known and accessible to a different function or circuitry. The control flow can further pass by notifying the different function or circuitry, such as by using a flag, an interrupt, a status signal, or a combination thereof. The control flow can further pass using a combination of the processes described above.

The computing system 100 can analyze one or more applications, including the application 204 such as the first executable program 226, the second executable program 228, or a combination thereof as represented in the box 604. The computing system 100 can determine details regarding one or more of the application 204 corresponding to one or more end users.

The computing system 100 can crawl mobile applications from application store or distributor and obtain the metadata 212 of FIG. 2, the community feedback 218 of FIG. 2, the application package 206 of FIG. 2, the application library 208 of FIG. 2, or a combination thereof. The computing system 100 can extract information regarding the above information as features from different views. The computing system 100 can analyze the one or more applications based on determining an inherent privacy setting as represented in a box 622, determining functions as represented in a box 624, or a combination thereof.

The computing system 100 can determine the inherent privacy settings as represented in the box 622. The computing system 100 can determine the inherent privacy settings of one or instances of the application 204 including the first executable program 226, the second executable program 228, or a combination thereof. The computing system 100 can determine the inherent privacy settings based on determining the application-specific privacy setting 304 for controlling communication for the application 204 associated with one or more end users including the user 110.

The computing system 100 can determine the application-specific privacy setting 304 based on analyzing the application 204, a source or a provider of the application 204, or a combination thereof. For example, the computing system 100 can determine the application-specific privacy setting 304 based on the application package 206, the application library 208, the periphery access set 210 of FIG. 2, the metadata 212, or a combination thereof associated with the application 204.

Continuing with the example, the computing system 100 can include files, extensions, keywords, types or categorizations thereof, or a combination thereof for various available instances or values of the application package 206, the application library 208, the periphery access set 210, the metadata 212, or a combination thereof. The computing system 100 can further include weights, processes, methods, equations, or a combination thereof assigned or predetermined for the various available instances or values.

Continuing with the example, the computing system 100 can determine the application-specific privacy setting 304 for the application 204 or an aspect thereof based on calculations using file, extension, keyword, type or categorization thereof, or a combination thereof corresponding to the application 204. The computing system 100 can determine the application-specific privacy setting 304 based the corresponding weights, processes, methods, equations, or a combination thereof.

Also for example, the computing system 100 can determine the application-specific privacy setting 304 based on the application type 216 of FIG. 2 of the application 204. The computing system 100 can include a set of types or categories including various instances of applications. The computing system 100 can further include a predetermined value or instance of the application-specific privacy setting 304 corresponding to each of the categories. The computing system 100 can determine the application type 216 of the application 204 and determine the application-specific privacy setting 304 as the predetermined value corresponding to the application type 216.

Also for example, the computing system 100 can determine the application-specific privacy setting 304 based on a developer, a distributer, a provider or a seller, or a combination thereof for the application 204. The computing system 100 can use a description, a set of permissions sought from the user 110, terms of use, application specification, or a combination thereof to determine the application-specific privacy setting 304.

As a more specific example, the computing system 100 can include a set of keywords and algorithms, such as a machine-learning or pattern recognition algorithm, to use content of the descriptions, the application specification, terms of use, or a combination thereof, for determining the application-specific privacy setting 304. Also as a more specific example, the computing system 100 can include a mechanism for identifying and analyzing permissions sought by the application 204 from the user 110. The computing system 100 can identify and analyze a GUI from the application 204 or the application package 206 for the installation screen for the permissions.

The computing system 100 can use one or more of the control circuits, such as the first control circuit 412, the second control circuit 434, the third control circuit 512, or a combination thereof, to determine the inherent settings as represented in the box 622. The computing system 100 can use one or more control interfaces, such as the first control interface 422, the second control interface 444, the third control interface 522, or a combination thereof, to access the various information regarding the application 204, the predetermined information or processes, or a combination thereof. The computing system 100 can store the inherent settings including the application-specific privacy setting 304 for the application 204 in one or more of the storage circuits, such as the first storage circuit 414, the second storage circuit 446, the third storage circuit 514, or a combination thereof.

The computing system 100 can determine the functions as represented as represented in the box 624. The computing system 100 can determine the functions based on determine one or more instances of the function 202 for implementing the application 204. The computing system 100 can determine one or more instances of the function 202 making up or included in each of the application 204.

The computing system 100 can determine the one or more instances of the function 202 for the application 204 in a variety of ways. For example, the computing system 100 can decompose the application 204 to determine the one or more instances of the function 202 utilized during operation or implementation of the application 204.

Also for example, the computing system 100 can test use cases or provide input stimulus to the application 204 under a test or analysis environment. The computing system 100 can identify and record the function calls made during operation or implementation of the application 204 to hardware, such as the communication circuit, the location circuit, the storage circuit, the user interface, or a combination thereof.

Also for example, the computing system 100 can determine the one or more instances of the function 202 for the application 204 based on accessing a listing or a table identifying one or more functions utilized by the application 204. The computing system 100 can include the listing or the table predetermined by the computing system 100 for identifying the one or more instances of the function 202 for a set of known or available applications. The computing system 100 can further access the listing or the table as provided by a developer, a distributer, a seller, a store, or a combination thereof sourcing the application 204.

The computing system 100 can determine the application-specific privacy setting 304 for the application 204 corresponding to the function 202 utilized by the application 204. The computing system 100 can determine the application-specific privacy setting 304 corresponding to the function 202 for controlling communication for the function 202 of the application 204.

The computing system 100 can include a weight, a value, or a combination thereof corresponding to each instance of the function 202. The computing system 100 can further include an equation, a method, a process, or a combination thereof for determining the application-specific privacy setting 304 based on combining or calculating the weight or the value corresponding to multiple functions for each of the application 204.

The computing system 100 can use one or more of the communication circuits, the control interfaces, or a combination thereof of the first device 102, the second device 106, the third device 108, or a combination thereof to access the various information. The computing system 100 can use one or more of the control circuits of the first device 102, the second device 106, the third device 108, or a combination thereof to determine the function 202, the application-specific privacy setting 304, or a combination thereof for the application 204. The computing system 100 can further store the function 202, the application-specific privacy setting 304, or a combination thereof in one or more of the storage circuits of the first device 102, the second device 106, the third device 108, or a combination thereof.

After analyzing one or more applications, the control flow can pass to determine the sources as represented in the box 604. The control flow can be passed as described above between analyzing one or more end users as represented in the box 602 and analyzing the applications as represented in the box 604, but using the processing results of analyzing the applications.

The computing system 100 can determine the sources for policy information as represented in the box 606. The computing system 100 can determine the sources external to the application 204 or provider of the application 204. The computing system 100 can determine the sources for the community feedback 218 of FIG. 2 including the user feedback 220 of FIG. 2.

The computing system 100 can determine the sources for the community feedback 218 in a variety of ways. For example, the computing system 100 can determine search terms for the application 204. The computing system 100 can determine keywords, the application type 216, or a combination thereof.

Continuing with the example, the computing system 100 can determine the keywords, the application 204, or a combination thereof from the application package 206, the application library 208, the metadata 212, the application description 214 of FIG. 2, or a combination thereof. The computing system 100 can search the internet or a database for the keywords, the application 204, or a combination thereof for the community feedback 218.

Also for example, the computing system 100 can determine the sources from a set of predetermined sources. The computing system 100 can include a table, access information including addresses, a database, or a combination thereof identifying the sources.

As a more specific example, the computing system 100 can include a customer feedback database for applications. Also as a more specific example, the computing system 100 can include addresses for websites or databases for customer feedbacks or ratings, professional or popular reviewer or analyzing service, or a combination thereof. The computing system 100 can include access information for an application store, a technology review website, a popular blogger, or a combination thereof.

Continuing with the example, the computing system 100 can search the predetermined set for the application 204, such as using a keyword, a title, the application type 216, the application description 214, or a combination thereof for the application 204. The computing system 100 can determine the corresponding matches within the set as the source for the community feedback 218 regarding the application 204.

Also for example, the computing system 100 can log or record the user feedback 220. The computing system 100 can recognize or identify input or stimulus from the user 110 as the user feedback 220 based on the GUI utilized for the input or stimulus, web address associated with the input or stimulus, keywords or values included in the input or stimulus, or a combination thereof. The computing system 100 can store the input or stimulus from the user 110 and the identification thereof to log or record the user feedback 220.

The computing system 100 can use a predetermine algorithm, mechanism, process, method, or a combination thereof to determine the keywords, the application 204, or a combination thereof, implement the search, or a combination processes thereof. The computing system 100 can accessed the predetermined algorithm, mechanism, process, method, or a combination thereof described above using one or more of the circuit interfaces, such as one or more of the control interfaces, one or more of the communication interfaces, one or more of the storage interfaces, or a combination thereof. The predetermined algorithm, mechanism, process, method, or a combination thereof can also be included in the first software 426 of FIG. 4, the second software 442 of FIG. 4, the third software 526 of FIG. 5, or a combination thereof.

The computing system 100 can use one or more of the control circuits, one or more of the communication circuits, or a combination thereof to determine the sources for policy information as represented in the box 606. The computing system 100 can further store the sources corresponding to the application 204, the user feedback 220, or a combination thereof in one or more of the storage circuits.

After analyzing one or more applications, the control flow can pass to determine the sources as represented in the box 604. The control flow can be passed as described above between analyzing one or more end users as represented in the box 602 and analyzing the applications as represented in the box 604, but using the processing results of analyzing the applications.

The computing system 100 can generate one or more privacy profiles, including the user-specific privacy profile 320 of FIG. 3, the application privacy profile 322 of FIG. 3, or a combination thereof as represented in the box 608. The computing system 100 can generate one or more privacy profiles based on directly querying and interacting with the end user, generating based on end user's indirect behaviors or interactions for other unrelated applications or context, or a combination thereof. The computing system 100 can further generate the one or more privacy profiles based on updating existing instances of the one or more privacy profiles by changing a setting or a policy based on recent or dynamic indirect input.

The computing system 100 can generate one or more privacy profiles for controlling one or more applications including the applications within the application set 224 for the user 110. The computing system 100 can generate one or more privacy profiles for controlling communication for the application set 224 corresponding to the first device 102, the second device 106, or a combination thereof.

For example, the computing system 100 can generate one or more privacy profiles for controlling the first executable program 226, the second executable program 228, or a combination thereof. As a more specific example, the computing system 100 can generate one or more privacy profiles based on information from one application for controlling the one application or another application.

The computing system 100 can generate one or more privacy profiles based on a variety of indicators, such as the privacy baseline 314, the application-specific privacy setting 304, the user-specific privacy profile 320, the application 204 or associated information, the privacy setting input 302, the user profile 306, or a combination thereof. The computing system 100 can generate one or more privacy profiles based on analyzing the privacy baseline 314, the application-specific privacy setting 304, the first executable program 226, the second executable program 228, the application set 224, or a combination thereof.

The computing system 100 can analyze in a variety of ways. For example, the computing system 100 can analyze user intent, tendency, pattern, or a combination thereof associated with the privacy baseline 314, the privacy setting input 302, the function 202, the usage context 222 associated thereto, or a combination thereof.

Also for example, the computing system 100 can analyze the privacy baseline 314, the privacy setting input 302, the function 202, the usage context 222 associated thereto, or a combination thereof across multiple applications within the application set 224 of the same user. As a more specific example, the computing system 100 can calculate patterns, correlations, statistics, or a combination thereof for the privacy setting input 302 in connection to specific functions across the application set 224.

Continuing with the more specific example, the computing system 100 can generate the user-specific privacy profile 320 based on a specific instance of the function 202 or an aspect of the application 204. The computing system 100 can generate the user-specific privacy profile 320 based on the patterns, correlations, statistics, or a combination thereof in the privacy setting input 302 according to the function 202 across the application set 224 for the user 110. The computing system 100 can further set the generated or updated instance of the user-specific privacy profile 320 as the privacy baseline 314 for latter updates.

Also as a more specific example, the computing system 100 can further calculate patterns, correlations, statistics, or a combination thereof for the privacy setting input 302 in connection to specific instances of the usage context 222 associated thereto in the user history 308. The computing system 100 can account for recipients, the estimated goal or objective of the user's usage of the application 204, a time or a place in using the application 204, an estimated importance or urgency of the user 110 in using the application 204, other users involved or nearby the user 110 during the usage, or a combination thereof.

Also as a more specific example, the computing system 100 can further calculate patterns, correlations, statistics, or a combination thereof for the privacy setting input 302 in connection to the application type 216, the application package 206, the application library 208, or a combination thereof across the application set 224. The computing system 100 can account for patterns of usage or user's comfort level for advertisements, freeware, location-sharing or reporting, report or sharing of usage statistics, or a combination thereof. The computing system 100 can further account for user's patterns of usage or user's comfort level according to specific types of applications, such as games, navigational applications, digital assistant, or a combination thereof.

Also as a more specific example, the computing system 100 can further calculate patterns, correlations, statistics, or a combination thereof for the privacy setting input 302 for controlling the first executable program 226. The computing system 100 can apply or implement the privacy setting input 302 for the second executable program 228 based on patterns, correlations, statistics, or a combination thereof of the first executable program 226. The computing system 100 can control the second executable program 228 based on similarities or connections to the first executable program 226, such as in type, utilized functions, the application library 208, or a combination thereof.

The computing system 100 can generate the user-specific privacy profile 320 using a heterogeneous analysis mechanism 626. The heterogeneous analysis mechanism 626 is a method, a process, a circuitry, or a combination thereof utilizing heterogeneous sources or indicators to generate privacy policies.

The heterogeneous analysis mechanism 626 can generate the privacy policy using multiple or different instances of indicators or sources, aspects of the application 204, perspectives, or a combination thereof. The heterogeneous analysis mechanism 626 can assess risk or generate the privacy policy from the user's perspective instead of relying only the information from the provider of the application 204.

The heterogeneous analysis mechanism 626 can be for implementing a general framework for user-centric personalized mobile app risk assessment for mobile apps on devices. The heterogeneous analysis mechanism 626 can be implemented with an engine, a circuit, a function, or a combination thereof.

The heterogeneous analysis mechanism 626 can fully consider the user's privacy preference and privacy controls. The computing system 100 can utilize the heterogeneous analysis mechanism 626 to dynamically analyze mobile application risk based on users' privacy settings. The heterogeneous analysis mechanism 626 can fully utilize the different users' similarities and different apps' similarities, to make sure that users' privacy risk is automatically adjusted and learned.

The computing system 100 can use the heterogeneous analysis mechanism 626 in a variety of ways to generate the privacy policy. For example, the heterogeneous analysis mechanism 626 can utilize heterogeneous features from different views, such as user comments, textual description, code analysis, ads library, or a combination thereof. The computing system 100 can generate the user-specific privacy profile 320 using the heterogeneous analysis mechanism 626 for analyzing one or more instances of the application 204 based on the application library 208, the application type 216, the community feedback 218, or a combination thereof including or beyond the metadata 212 for the one or more instances of the application 204.

Also for example, the heterogeneous analysis mechanism 626 can utilize the heterogeneous features or indicators to rank the privacy risks of applications. Also for example, the heterogeneous analysis mechanism 626 can further utilize multi-view semi-supervised learning techniques. Also for example, the heterogeneous analysis mechanism 626 can perform risk analysis from textual description, from permissions used by applications, from crowd-sourced user comments, from libraries of the applications, or a combination thereof.

As a more specific example, the heterogeneous analysis mechanism 626 can analyze the textual descriptions, such as the application description 214, the community feedback 218, or a combination thereof. The heterogeneous analysis mechanism 626 can analyze the text using term-frequency-inverse document frequency (tf-idf) for numerical statistic to analyze importance of terms within the text.

Continuing with the example, the heterogeneous analysis mechanism 626 can analyze the tf-idf feature for each term 'w' in texts corresponding to an instance of the application 204, represented as 'i', based on:

$$\log(TF_w^i+1)\log\left(\frac{\#app}{DF_w+1}\right).. \quad \text{Equation (1)}$$

The term '$TF_w^i$' can represent a term frequency of 'w' for app 'i's description, and the term '$DF_w$' can represent a number of applications that have 'w' in their descriptions, such as the application description 214, the community feedback 218, or a combination thereof.

Also as a more specific example, the heterogeneous analysis mechanism 626 can analyze the community feedback 218 using a label system. The computing system 100 can use the heterogeneous analysis mechanism 626 to utilize their labeled dataset as the training data to train a classifier, which can automatically generate labels of various quantity or sets for each comments. As an illustrative example, the computing system 100 can use one or more of 11 labels including 'system', 'executing', 'foreground', 'background', 'privacy', 'spam', 'before', 'after', 'finance', 'general', 'others', or a combination thereof.

Continuing with the specific example, the computing system 100 can use the heterogeneous analysis mechanism 626 to utilize a Logistic Regression (LR) model trained for each label, and the models are used to automatically annotate the other comments. The computing system 100 can average binary label vector of comments with respect to each application to provide a multi-dimensional feature vector. The dimension can correspond to the number of labels utilized for the process.

Also as a more specific example, the computing system 100 can use the heterogeneous analysis mechanism 626 to implement static code analysis techniques to generate the true permission usages of each application. Given an instance of the application package 206, the computing system 100 can decompile the classes.dex to the jar file with help of the third-party tool, such as dex2jar, as an illustrative example.

Continuing with the example, the computing system 100 can generate the function call graph (FCG) of the jar file, and afterwards, identify instances of the function 202 that call the specific permissions. The mapping from the function 202 to permissions can be queried from the "function-mapping database" stored before-hand. Finally, the computing system 100 can collect all the permissions used by a specific instances of the application 204, and output the true permission accessed by each instances of the application 204.

Continuing with the example, the computing system 100 can represent the permission access set as a vector, where the length of the vector is the number of the permissions. For illustrative example, a specific instance of the application 204, "dropbox" can be analyzed to access the permissions such as, 'access_network_state', 'get_account', 'vibrate', 'access_wifi_state', 'camera', 'internet', 'read_contact', other permissions, or a combination thereof. The corresponding elements in the vector can be set to 1, while the other element in a vector can be set to 0.

Also as a more specific example, the computing system 100 can use the heterogeneous analysis mechanism 626 to analyze the advertising associated with the application 204. The periphery access set 210 can include ad libraries that are extensively embedded into mobile applications for monetization purposes and different mobile applications may use different ads libraries. The ad libraries can be required to be claimed in the manifest file before the ad libraries are added into the application package 206. The computing system 100 can scan the periphery access set 210 claimed in the manifest file, and match them against the ads signature database, which can include a most popular set of ad libraries used amongst applications.

Continuing with the specific example, the computing system 100 can get the list of called ad libraries used in each instance of the application 204 after signature mapping. For illustrative example, for the popular mobile app 'aroundme', it embeds three ad libraries, such as 'com.mopub', 'mobilead', 'com.google.ads'. The ads-library feature can be represented as a vector, where the length of the vector can be the number of the ad-libraries, in which value 1 indicates that the ad library is called, and value 0 indicates that the ads library is not called in the app.

The computing system 100 can generate the user-specific privacy profile 320 for controlling communication for the application set 224 based on the usage context 222. The computing system 100 can generate the user-specific privacy profile 320 based on correlations or patterns between previous privacy settings and the usage context 222 corresponding to the previous privacy settings. The computing system 100 can generate the user-specific privacy profile 320 including the privacy settings matching the current instance of the usage context 222.

The computing system 100 can generate the user-specific privacy profile 320 including the application privacy profile 322 corresponding to the application 204. For example, the computing system 100 can use the heterogeneous analysis mechanism 626 to generate the first privacy profile 324 of FIG. 3 corresponding to the first executable program 226 for the user 110, the second privacy profile 326 of FIG. 3 corresponding to the second executable program 228 for the user 110, or a combination thereof.

The computing system 100 can further generate the application privacy profile 322 based on assessing the risk of the application 204 as represented in a box 628. The computing system 100 can assess the risk based on calculating the overall rating 328 of FIG. 3, based on determining the access privacy categorization 330 of FIG. 3, based on calculating the category-specific rating 332 of FIG. 3, based on determining the category-specific access 334 of FIG. 3, or a combination thereof.

The computing system 100 can perform a multi-view risk assessment for assessing the risk. Given the privacy risks of a small number of known applications, assessing the risk involves automatically inferring the privacy risk of applications from the features in different views.

The computing system 100 can propagate the risks of the applications from the labeled applications to unknown applications, according to applications pairwise similarity graph manifold information. The computing system 100 can calculate the risk scores of two applications to be similar when the similarities of the two applications are high.

The application pairwise similarity, represented as '$W_v$', can be computed using the features from different views. Moreover, the computing system 100 can allow users to give users' preference or expert knowledge to assess the risks of different apps.

As a specific example, the risk score of mobile application can be depicted as a number at the scale 0-5, where 5 indicates the highest risk score, and 0 indicates the lowest risk score. The privacy risk assessment can learn the risk score, represented as a number, for an unknown application. The output can be the learned privacy risks of different applications, and the weight for features from different views.

Also as a specific example, the computing system 100 can learn a consensus risk ranking indicator, represented as '$f=[f_1, f_2, \ldots, f_n] \in R^n$'. The indicators can be shared by features from different views, independent of views. For each view, the computing system 100 can minimize the risk propagation operator, given the consensus risk ranking 'f'. The minimization can be represented as:

$$\min_f f^T \hat{L}^V f = \min_f \sum_{ij} W_{ij}^v \left\| \frac{f_i}{\sqrt{D_{ii}^v}} - \frac{f_j}{\sqrt{D_{jj}^v}} \right\|^2 .. \qquad \text{Equation (2)}$$

The term '$W_{ij}^v \in R^{n \times n}$' can represent a symmetric matrix which encodes the similarity among the pairwise applications 'i' and 'j' in term of feature view 'v'. The term '$f_i$' can represent the privacy risk for the application 204 'i'. The computing system 100 can set $D_{ii}^v = \Sigma_j W_{ij}^v$, and the graph Laplacian for the v-th view can be represented as $L^v = D^v - W^v$, and the normalized graph Laplacian can be represented as:

$$\hat{L}_v = I - (D^v)^{-\frac{1}{2}} W^v (D^v)^{-\frac{1}{2}}. \qquad \text{Equation (3).}$$

As the prior knowledge, the computing system 100 can allow users to give feedback or users' preference, which indicate a set of strong pairwise ranked applications and weak pairwise ranked applications. The computing system 100 can set S=(i; j) for strong pairwise ranked applications, where application i ranked strongly before application j or users has a strong preference to rank app i before application j. The computing system 100 can further set W=(i; j) for weak pairwise ranked applications, where application i ranked very close to application j or users have no interest to distinguish application i from application j.

The computing system 100 can utilize the considerations discussed above to optimize an objective function w.r.t. to generate risk ranking f, as represented by:

$$\min_f \Sigma_v f^T \hat{L}^v f + \lambda \|\alpha\|_2^2; \ s.t.\ \alpha^T e = 1;\ \alpha \geq 0;\ f_i = y_i\ (1 \leq i \leq l);\ f_i - f_j \square 0,\ \forall (i,j) \in S;\ f_i - f_j \approx 0,\ \forall (i,j) \in W. \qquad \text{Equation (4).}$$

The term 'V' can represent the number of views from the application 204. The expression '$\alpha = [\alpha_1, \alpha_2, \ldots, \alpha_V]^T \in R^V$' can denote the non-negative normalized weight for each view. The term '$e = [1, 1, \ldots, 1]^T \in R^V$' can represent a vector with all ones.

The term '$\hat{L}^v$' can represent the normalized graph Laplacian matrix for each view 'v'. The term 'f' can represent the risk estimation indicator to be solved and the term 'λ' can represent a regularization parameter for avoiding the trivial solution of 'α' and also for avoiding overfitting.

For all the pairs given in strong pairwise constraint set, the computing system 100 can process $f_i$ much larger than $f_j$. For the pairs in weak pairwise constraint set, the computing system 100 can process $f_i$ close to $f_j$ applications. Meanwhile, the computing system 100 can adaptively learn the weight for each view of features, such as assigning high weight to the feature view which has higher discriminant ranking power. Further details regarding assessment of the risk as represented in the box 628 are discussed below.

The computing system 100 can use one or more of the control circuits, such as the first control circuit 412, the second control circuit 434, the third control circuit 512, or a combination thereof to generate one or more privacy profiles. The computing system 100 can store the one or more privacy profiles or any intermediate results thereof in one or more of the storage circuits, such as, the first storage circuit 414, the second storage circuit 446, the third storage circuit 514, or a combination thereof.

After generate one or more privacy profiles, the control flow can pass to configure the device as represented in the box 610. The control flow can be passed as described above between analyzing one or more end users as represented in the box 602 and analyzing the applications as represented in the box 604, but using the processing results of generating the one or more privacy profiles.

The computing system 100 can configure a device according to the one or more privacy profiles as represented in the box 610. The computing system 100 can configure the first device 102, the second device 106, the third device 108, or a combination thereof. For example, the computing system 100 can configure the device to communicate a message to the user 110, such as a warning or a suggestion. Also for example, the computing system 100 can further configure the device to change or update a setting or a control regarding communication or privacy.

As a more specific example, the computing system 100 can generate the graphical risk summary 338 of FIG. 3. The computing system 100 can generate the graphical risk summary 338 for visually representing communication control or privacy management for the user 110. The computing system 100 can generate the graphical risk summary 338 based on the user-specific privacy profile 320.

Continuing with the example, the computing system 100 can calculate the risk, such as a score or a level, for the application 204 or a specific aspect thereof according to the user 110. The computing system 100 can identify the application 204, a portion or an aspect thereof, such as the function 202 or a communication category, and corresponding rating or calculated risk on the graphical risk summary 338. For illustrative example, the computing system 100 can list the name of the application 204 or the portion or the aspect thereof, list the value or a degree corresponding to the risk of the application 204 or the portion or the aspect thereof.

Also as a more specific example, the computing system 100 can generate the application privacy recommendation 336 of FIG. 3. The computing system 100 can generate the application privacy recommendation 336 based on comparing the privacy baseline 314, the application-specific privacy setting 304, the first executable program 226, the second executable program 228, the application set 224, or a combination thereof. The computing system 100 can generate the application privacy recommendation 336 based on identifying an outlier in the application-specific privacy setting 304 for the application 204.

Continuing with the more specific example, the computing system 100 can identify the outlier from within settings for various aspects or functions of the application 204, within the applications of the application set 224, within settings for the application 204 for other end users, or a combination thereof. The computing system 100 can generate the application privacy recommendation 336 as the setting, the value, the configuration, or a combination thereof typical or expected for the outlier.

The computing system 100 can similarly search the application set 224, the application store, or a combination thereof for a new or a replacement instance of the application 204. The computing system 100 can search and identify the new instance of the application 204 with similar or overlapping instance of the application type 216, the metadata 212, the usage context 222, or a combination thereof.

The computing system 100 can further search and identify within the similar or overlapping instances of the application 204 for the privacy settings or controls matching the user-specific privacy profile 320. The computing system 100 can generate the application privacy recommendation 336 as a name, a link, a source, a description, or a combination thereof corresponding to the instance of the application 204 similar or overlapping with a specific instance of the application 204 but with privacy settings or controls better matching or adhering to the user-specific privacy profile 320 than the specific instance of the application 204.

The computing system 100 can further generate the application privacy recommendation 336 associated with installation of the application 204. The computing system 100 can analyze the application package 206, the application library 208, setting or configuration template predetermined by the computing system 100, or a combination thereof corresponding to the application 204 during downloading process or initialization process for the application 204.

The computing system 100 can generate the application privacy recommendation 336 including the setting or configuration information specific for the application 204 and matching or adhering to the user-specific privacy profile 320 based on the analysis. The predetermined setting or configuration template can include various settings or configurations for various different applications for achieving different levels of privacy protection. The computing system 100 can access the predetermined template using the application 204 and the user-specific privacy profile 320 as input to generate the application privacy recommendation 336.

The computing system 100 can update or generate the user-specific privacy profile 320 based on generating the application privacy recommendation 336. The computing system 100 can generate or update the user-specific privacy profile 320 based on changes to the setting or configuration according to the application privacy recommendation 336, acceptance or correction by the user 110 for the application privacy recommendation 336, or a combination thereof.

The computing system 100 can update or generate the user-specific privacy profile 320 based on generating the privacy profiles as represented in the box 608 based on configuring the device as represented in the box 610. The computing system 100 can update configuration or settings for the first device 102, the second device 106, the third device 108, or a combination thereof based on a response or acceptance from the user 110 in response to the application privacy recommendation 336.

The computing system 100 can further update or generate the user-specific privacy profile 320 based on the application privacy recommendation 336 for controlling the second executable program 228 based on the application-specific privacy setting 304 corresponding to the first executable program 226. The computing system 100 can change settings or configurations for the second executable program 228 based on the user accepting or responding to the application-specific privacy setting 304 corresponding to the first executable program 226.

The computing system 100 can update the second executable program 228 to have the same value or setting as the response or update from the user 110, at least the value or setting as the response or update from the user 110. The computing system 100 can update the second executable program 228 based on the user's tendencies or patterns according to the user profile 306 or the user-specific privacy profile 320.

The computing system 100 can further update the second executable program 228 based on similarities, such as in the application type 216, the metadata 212, the application type 216, or a combination thereof between the first executable program 226 and the second executable program 228. The computing system 100 can generate or update the user-specific privacy profile 320 based on changes to the setting or configuration according to the application privacy recommendation 336, acceptance or correction by the user 110 for the application privacy recommendation 336, or a combination thereof.

The computing system 100 can further configure or set controls for a specific aspect or feature of the application 204 based on the user's response to the application privacy recommendation 336. The computing system 100 can configure or set the controls by managing the configurations or controls for the function 202 for the application 204.

For example, the computing system 100 can reconfigure the settings in a stored file or register, recompile the application 204, or a combination thereof to manage the function 202 utilized by the application 204. Also for example, the computing system 100 can use the operating system or another layer of software to monitor and manage calls or access to the function 202 during execution of the application 204 according to the user's response to the application privacy recommendation 336.

The computing system 100 can configure the device, such as the first device 102, the second device 106, the third device 108, or a combination thereof based on analyzing the users' general privacy settings and particular settings for each application. For example, the computing system 100 can utilize machine learning mechanism or pattern analysis mechanism to analyze the privacy baseline 314, the application-specific privacy setting 304, or a combination thereof. The computing system 100 can generate the user-specific privacy profile 320 as the result of the analysis.

Default settings for configuring the device can include a particular control on permission for critical resources for the user 110, such as location, contact, internet, or a combination thereof. For example, the computing system 100 can include particular controls or permission settings for the application 204, for the periphery access set 210, or a combination thereof accessing the location information of the user 110, the user profile 306, the internet, or a combination thereof.

The computing system 100 can configure the device based on determining a desirable risk level. The desirable risk level can be determined based on user input, the user profile 306, predetermined setting or level, or a combination thereof. The computing system 100 can configured the device based on processing the application privacy recommendation 336, the privacy setting adjustment 340 of FIG. 3, or a combination thereof for changing the overall rating 328 or the category-specific rating 332 to the desirable risk level.

The computing system 100 can further configure the device through the application privacy recommendation 336, the privacy setting adjustment 340, or a combination thereof for adjustment of user's privacy control on permissions for critical resources, such as location, contact, internet, an access thereto, or a combination thereof as exemplified above. The computing system 100 can further configure the device for adjustment of user's personal general privacy preference settings, such as for allowing more ads, more spam messages, or a combination thereof.

The computing system 100 can configure the device using one or more of the control circuits, communication circuits, or a combination thereof. The computing system 100 can store the configurations in one or more of the storage circuits.

The computing system 100 can further utilize the graphical risk summary 338, the application privacy recommendation 336, or a combination thereof to interact with the user 110. The graphical risk summary 338, the application privacy recommendation 336, or a combination thereof can include a feature or a function to accept, decline, adjust, or a combination thereof for the suggestions, the levels, the controls, or a combination thereof in therein.

The user 110 can provide the intended value of risk score through the graphical risk summary 338 or the application privacy recommendation 336, and the system can automatically determine the corresponding setting of the application 204. For example, if the user 110 wants to set high risk to the application 204, the system can recommend the settings of the application 204 necessary to achieve the intended value of risk score. The settings can include the general settings of privacy profilings and the particular setting for a particular application.

As an illustrative example, the graphical risk summary 338 as exemplified in FIG. 3 can include the feature or the function for the user 110 to move the arrow indicator to a location desired by the user 110. The computing system 100 can use one or more of the user interfaces, one or more of the communication circuits, or a combination thereof to receive the adjustments or other inputs and interactions through the graphical risk summary 338, the application privacy recommendation 336, or a combination thereof.

The computing system 100 can determine a level or a degree of protection corresponding to the input. The computing system 100 can determine the settings, the configurations, the changes or adjustments, or a combination thereof necessary to achieve the level or the degree of protection corresponding to the input as described above.

The computing system 100 can further notify or verify the necessary settings, configurations, changes or adjustments, or a combination thereof with the user 110 using an updated instance of the application privacy recommendation 336. The computing system 100 can further implement the necessary settings, configurations, changes or adjustments, or a combination thereof as described above with the privacy setting adjustment 340.

It has been discovered that the user-specific privacy profile 320 based on the heterogeneous analysis mechanism 626 provides increased protection for user's information and prevent unintended leakage of information. The heterogeneous analysis mechanism 626 can use various views and sources to analyze the application 204 and in turn estimate the preferences and goals of the user 110 using the application 204. The heterogeneous analysis mechanism 626 can fully utilize the different users' similarities and different application's similarities, to make sure that users' privacy risk is automatically adjusted and learned.

The various views and sources can provide increased sources for information and eliminate or mitigate biases or motivations for promoting the application 204. The increased sources and management of the biases can increase the accuracy in analyzing the application 204 and the user 110, which can further provide the increased protection.

It has further been discovered that the user-specific privacy profile 320 based on the application-specific privacy setting 304 and the privacy baseline 314 provides accurate reflection of user's preference or comfort levels for controlling communications or protecting privacy of the user's information. The user-specific privacy profile 320 based on the application-specific privacy setting 304 can capture dynamic and on-going updates and adjustments to the privacy setting provided by the user 110.

It has further been discovered that the user-specific privacy profile 320 based on the application-specific privacy setting 304 and the privacy baseline 314 can further provide personalized risk assessment by considering both the application privacy indicators and the users' privacy setting and privacy controls. Capturing the dynamic and on-going adjustments can enable implementation of up-to-date and accurate preference of the user 110 through the application set 224 for the user 110. Capturing the dynamic and on-going adjustments can further automatically learn the users' dynamic profiling and analyze the heterogeneous privacy indicators for personalized application risk assessment.

It has further been discovered that the user-specific privacy profile 320 and the application-specific privacy setting 304 based on analyzing the function 202 of the application 204 provides increased accuracy in assessing the application 204 as well as increased granularity of control for privacy protection. Assessment of the function 202 for the application 204 provides finer granularity in characterizing communications and potential privacy concerns. The functional level analysis can further provide controls at specific functional levels for managing and protecting user's privacy.

It has further been discovered that automatically and dynamically controlling settings or configurations for the second executable program 228 based on response to the application privacy recommendation 336 for the first executable program 226 provides increased usability and privacy protection. The computing system 100 can implement changes for applications based on user's update to another application. The computing system 100 can eliminate the user having to repeat the settings across the application set 224. The computing system 100 can further eliminate the possibility of user forgetting to implement the changes in an application and eliminate an unintended information leak.

Figure 7:
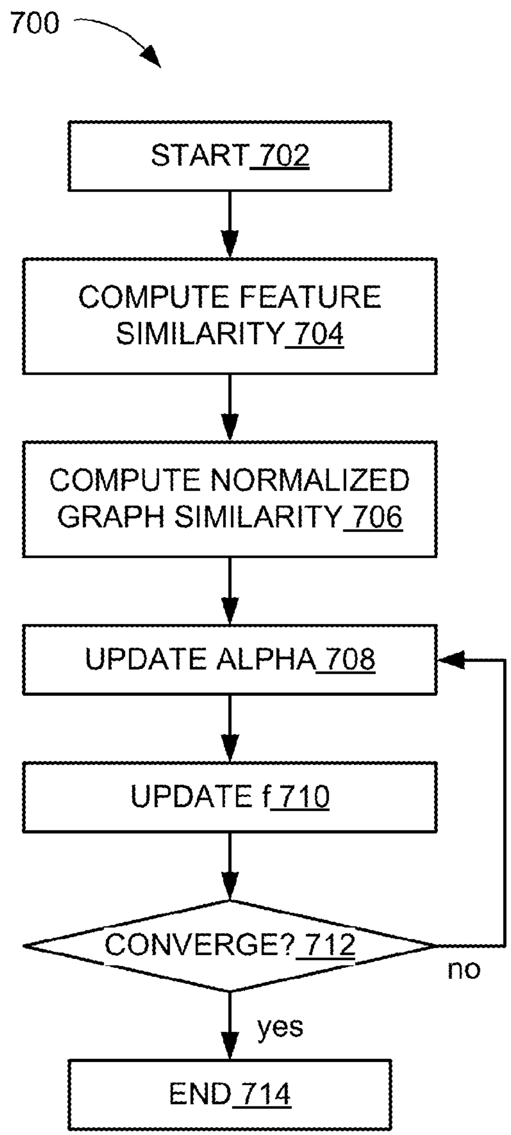
FIG. 7 is a further exemplary flow chart for representing the computing system of FIG. 1.

Referring now to FIG. 7, therein is shown a further exemplary flow chart 700 for representing the computing system 100 of FIG. 1. The further flow chart 700 can show the further details for assessing the risk as represented in the box 628 of FIG. 6. The further flow chart 700 can represent a procedure of computing optimal solution of privacy risk represented by 'f' and weight 'α'.

Following initialization of the process as represented in a box 702, the computing system 100 can process '$x_i^v$' as features extracted from the application 204 of FIG. 2 represented by 'i'in 'vth' view. The computing system 100 can then compute feature similarities as represented in a box 704.

The computing system 100 can compute feature similarity '$W^v$' in each view 'v'. The computing system 100 can compute the feature similarities based on calculating the pairwise similarity of applications in terms of v-th view based on:

$$W_{ij}^v = e^{-\gamma\|x_i^v - x_j^v\|^2}. \quad \text{Equation (5).}$$

The computing system 100 can further compute normalized graph similarity as represented in a box 706. The computing system 100 can compute the normalized graph similarity represented as '$\overline{L}_v$' in each view 'v'. The computing system 100 can compute the normalized graph similarity based on Equation (4) discussed above.

The computing system 100 can further update alpha parameter as represented in a box 708. The computing system 100 can update the alpha parameter 'α' based on solving a quadratic programming problem represented by:

$$\min_\alpha \left\|\alpha - \frac{b}{2\lambda}\right\|_2^2; \text{ s.t. } \alpha^T e = 1; \alpha \geq 0.. \quad \text{Equation (6)}$$

The computing system 100 can then update 'f' as represented in a box 710. Details regarding the update of parameter 'f' for optimal solution of privacy risk are discussed below.

The computing system 100 can check to see if the solutions converge as represented in a box 712. The computing system 100 repeat processes represented in the box 708, the box 710, and the box 712 when the solution does not converge. The computing system 100 can end the process when the solution converges as represented in a box 714.

The computing system 100 can use the converging results to calculate the overall rating 328 of FIG. 3, the access privacy categorization 330 of FIG. 3, the category-specific rating 332 of FIG. 3, the category-specific access 334 of FIG. 3, or a combination thereof. The computing system 100 can generate the access privacy categorization 330 as the set of views 'v' utilized in the process above, with each view representing the category-specific access 334.

The computing system 100 can calculate the category-specific rating 332 as the converging result for each of the view or the category-specific access 334. The computing system 100 can calculate the category-specific rating 332 for each category of communication or information access for the application 204 as represented by the category-specific access 334. The computing system 100 can further calculate the overall rating 328 based on combining, such as adding or averaging, the category-specific rating 332 for all instances of the category-specific access 334 within the set of views in the access privacy categorization 330 for the application 204.

The computing system 100 can use the category-specific rating 332, the category-specific access 334, or a combination thereof corresponding to one or more instances of the function 202 of FIG. 2. The computing system 100 can further process the set of the category-specific rating 332, the category-specific access 334, or a combination thereof for determining the outlier therein for configuring the device as represented in the box 610 of FIG. 6. The computing system 100 can generate the application privacy recommendation 336 of FIG. 3, the privacy setting adjustment 340 of FIG. 3, or a combination thereof based on the outlier within the set of the category-specific rating 332, the category-specific access 334, or a combination thereof.

The computing system 100 can further generate the graphical risk summary 338 of FIG. 3 based on the category-specific rating 332, the category-specific access 334, the overall rating 328, the access privacy categorization 330, or a combination thereof. The computing system 100 can generate the graphical risk summary 338 using a predetermined method, GUI, process, or a combination thereof to visually communicate the overall rating 328. The computing system 100 can list the access privacy categorization 330 including all applicable instances of the category-specific access 334. The computing system 100 can further list the category-specific rating 332 for the corresponding instance of the category-specific access 334.

It has been discovered that assessing the risk of the application 204 and generating the user-specific privacy profile 320 of FIG. 3 including the overall rating 328, the category-specific rating 332, the access privacy categorization 330, the category-specific access 334, or a combination thereof for the application 204 specific to the user 110 provides increased protection for user's information and prevent unintended leakage of information. The assessment of the risk as described above can utilize heterogeneous set of indicators from various views to analyze the application 204.

It has further been discovered that assessing the risk of the application 204 based on capturing the dynamic and ongoing adjustments can further automatically learn the users' dynamic profiling and analyze the heterogeneous privacy indicators for personalized application risk assessment. The assessment process as described above can further factor in the personal habits or preferences of the user 110 to prevent unintended leakage of information.

Figure 8:
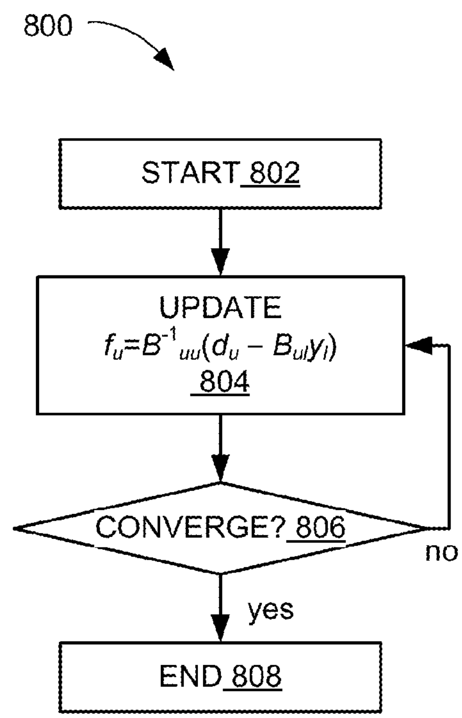
FIG. 8 is a detailed flow chart for updating step of FIG. 7.

Referring now to FIG. 8, therein is shown a detailed flow chart 800 for updating step of FIG. 7. The detailed flow chart 800 can describe the update f step represented in the box 710 of FIG. 7.

The step represented in the box 710 can include initialization as represented in a box 802. The computing system 100 can update the parameter 'f' as represented in a box 804.

For updating the parameter 'f', the computing system 100 can process '$\hat{L}^W$' for encoding the constraints in weak pairwise ranking constraints. The computing system 100 can further process '$\hat{L}^S$' for encoding the constraints in strong pairwise ranking constraints.

The computing system 100 can encode the weak pairwise ranking information in '$Q^W$' based on:

$$Q_{ij}^W = \begin{cases} \gamma_1;\ (i, j) \in W \\ 0;\ (i, j) \notin W \end{cases}, \text{ and } \hat{L}^W = I - (D^W)^{-\frac{1}{2}} Q^W (D^W)^{-\frac{1}{2}}. \qquad \text{Equation (7).}$$

The term '$\gamma_1$' can be a parameter including values greater than 0. The computing system 100 can further encode the strong pairwise ranking information in '$Q^S$' based on:

$$Q_{ij}^S = \begin{cases} \gamma_2;\ (i, j) \in S \\ 0;\ (i, j) \notin S \end{cases}, \text{ and } \hat{L}^S = I - (D^S)^{-\frac{1}{2}} Q^S (D^S)^{-\frac{1}{2}}. \qquad \text{Equation (8).}$$

The term '$\gamma_2$' can be a parameter including values greater than 0.

The computing system 100 can set:

$$B=\Sigma_v \alpha_v \hat{L}^v + \hat{L}^W, d=\hat{L}^S f. \qquad \text{Equation (9).}$$

The computing system 100 can use Equation (9) to compute the risk score for different applications. The computing system 100 can split 'f', 'd', and 'B' into labeled part, indexed from 1 to 'l', and unlabeled part, indexed from 'l+1' to 'l+u', represented as:

$$f = \begin{pmatrix} f_l \\ f_u \end{pmatrix}; d = \begin{pmatrix} d_l \\ d_u \end{pmatrix}; B = \begin{pmatrix} B_{ll} & B_{lu} \\ B_{ul} & B_{uu} \end{pmatrix}.. \qquad \text{Equation (10)}$$

The computing system 100 can use Equations (7)-(10) to determine the updated rule for 'f', represented as:

$$f_u = B_{uu}^{-1}(d_u - B_{ul} y_l). \qquad \text{Equation (11).}$$

The computing system 100 can use the Equation (11) to update the parameter 'f' for the consensus rank regarding risk.

The computing system 100 can check to see if the solutions converge as represented in a box 806. The computing system 100 can check the solutions resulting from processing Equation (11). The computing system 100 can repeat the process represented in the box 804 when the solution does not converge. The computing system 100 can end the process when the solution converges as represented in a box 808. After ending the process, the control flow can be passed to the step represented in the box 712 of FIG. 7.

It has been discovered that the user-specific privacy profile 320 of FIG. 3 and the device adjustments as discussed above can enable management of different levels of resource access control based on privacy risk assessment. Using location resource as an example, privacy risk assessment of the application 204 can vary based upon the level of location access grant, which can be recognized as a result of privacy risk analysis of the application 204. If the app is able to grant various location access levels, such as access_fine_location for providing precise-locations through GPS or Wi-Fi information, access_coarse_location for providing approximate location, access_mock_location for creating mock location, or a combination thereof, in order to change the overall privacy risk assessment of the app, the computing system can recommend or implement different levels of location control settings. The computing system 100 can suggest the user 110 to disable access_fine_location or automatically implement access_coarse_location without user's input. The user will observe that adjustment to these settings impacts the overall privacy risk assessment of the application 204.

As another example, computing system 100 can control or manage resource controls for the application 204 capable of running in both the frontend or background processes. Still using location resource as an illustration, access to this resource by background process or frontend process can be treated differently. For some applications, the resources accessed by the frontend process can be labeled more "sensitive" or "private" than those by the background process. For other applications, privacy concern can be the opposite. It has been discovered that the user-specific privacy profile 320 and the device adjustments provide different combinations on the control for application resources to achieve users' desired privacy tolerance level, depending on the runtime process determination. Users can be allowed to change their personal settings or controls to indicate whether the resource is accessible when the application 204 is actively running at the frontend or lingering at the background.

Further, while users may need to accept certain settings at the time of installation when downloading the application 204 from an app store, it has been discovered that the user-specific privacy profile 320 and the device configurations can enable the user 110 to change privacy related settings during the run time of the application 204. The user-specific privacy profile 320 along with the recommendation or the automating setting adjustment allow users to achieve the desired privacy risk level by changing the privacy settings and configurations, where fine-grained adjustments on different granularities of resources are allowed. The computing system 100 can enable the user 110 to select access permission for the application 204 separate from access permission for the application library 208 for each available access category.

Figure 9:
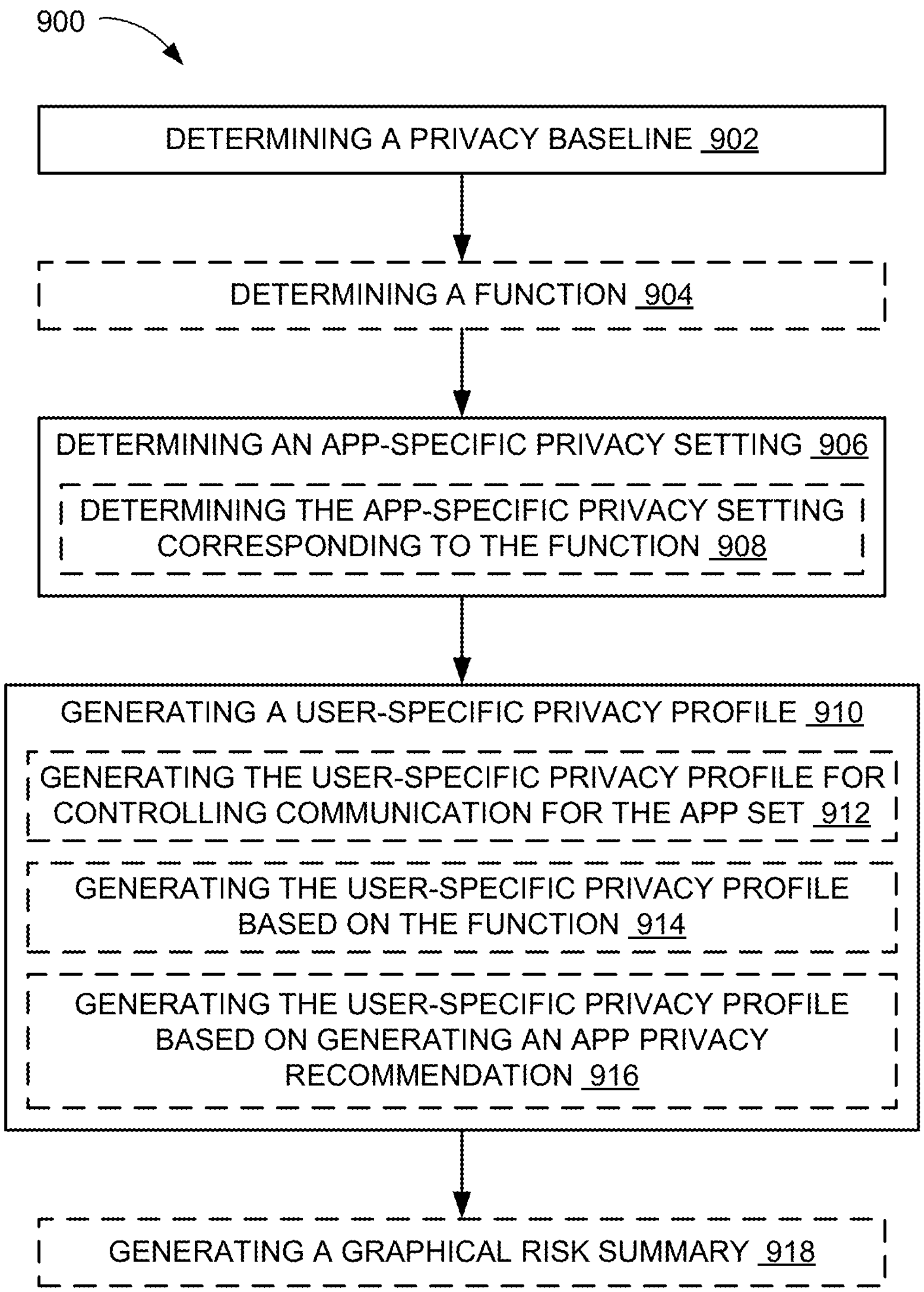
FIG. 9 is an exemplary flow chart of a method of operation of the computing system of FIG. 1 in a further embodiment.

Referring now to FIG. 9, therein is shown an exemplary flow chart of a method 900 of operation of the computing system 100 of FIG. 1 in a further embodiment. The exemplary flow chart 900 can include determining a privacy baseline for controlling communication for a user as represented in a box 902. The computing system 100 can determine the privacy baseline 314 of FIG. 2 as described above for analyzing one or more end users as represented in the box 602 of FIG. 6.

The exemplary flow chart 900 can include determining a function for implementing the application as represented in a box 904. The computing system 100 can determine the function 202 of FIG. 2 as described above for analyzing applications as represented in the box 604 of FIG. 6.

The exemplary flow chart 900 can include determining an application-specific privacy setting for controlling communication for an application associated with the user as represented in a box 906. The computing system 100 can determine the application-specific privacy setting 304 of FIG. 3 as described above for analyzing applications as represented in the box 604.

Determining the application-specific privacy setting can further include determining the application-specific privacy setting corresponding to the function for controlling communication for the function of the application as represented in a box 908. The computing system 100 can determine the application-specific privacy setting 304 corresponding to the function 202 as described above for analyzing applications as represented in the box 604.

The exemplary flow chart 900 can include generating a user-specific privacy profile based on the privacy baseline and the application-specific privacy setting as represented in a box 910. The computing system 100 can generate the user-specific privacy profile 320 of FIG. 3 based on the privacy baseline 314 and the application-specific privacy setting 304 as described above for generating privacy profiles as represented in the box 608 of FIG. 6.

Generating the user-specific privacy profile can further include generating the user-specific privacy profile for controlling communication for the application set as represented in a box 912. The computing system 100 can generate the user-specific privacy profile 320 for controlling communication for the application set 224 as described above for generating privacy profiles as represented in the box 608.

Generating the user-specific privacy profile can further include generating the user-specific privacy profile based on the function as represented in a box 914. The computing system 100 can generate the user-specific privacy profile 320 based on the function 202 as described above for generating privacy profiles as represented in the box 608.

Generating the user-specific privacy profile can further include generating the user-specific privacy profile based on generating an application privacy recommendation in a box 916. The computing system 100 can generate the user-specific privacy profile 320 based on generating the application privacy recommendation 336 as described above for generating privacy profiles as represented in the box 608.

The exemplary flow chart 900 can include generating a graphical risk summary based on the user-specific privacy profile in a box 918. The computing system 100 can generate the graphical risk summary 338 of FIG. 3 based on the user-specific privacy profile 320 for configuring a device as represented in the box 610 of FIG. 6.

The physical transformation from the dialog-flow framework 214, such as changes or updates to the instances of the message label 212, results in the movement in the physical world, such as physical change in information communicated for the user 110. Movement in the physical world results in updates to the subject interaction 202, which can be fed back into the computing system 100 and adjust the service information model 246, the dialog model 552, or a combination thereof.

The methods or processes described herein can be implemented in hardware or hardware accelerators, including passive circuitry, active circuitry, or both, in the first control circuit 412 of FIG. 4, the second control circuit 434 of FIG. 4, the third control circuit 512 of FIG. 5, or a combination thereof. The methods or processes can also be hardware implementation or hardware accelerators, including passive circuitry, active circuitry, or both, within the first device 102 of FIG. 1, the second device 106 of FIG. 1, the third device 108 of FIG. 1, or a combination thereof but outside of the first control circuit 412, the second control circuit 434, the third control circuit 512, or a combination thereof.

The computing system 100 has been described with methods or processes with an order as an example. The computing system 100 can partition or order the steps differently. For example, the convergence checks represented in the box 712 of FIG. 7 and the box 808 of FIG. 8 can be combined with conditional jumps to the step represented in the box 708 or the step represented in the box 804. Also for example, the determination of sources as represented in the box 606 of FIG. 6 can precede analysis of the applications as represented in the box 604 of FIG. 6.

For illustrative purposes, the various methods or processes have been described as being implemented with the first device 102, the second device 106, the third device 108, or a combination thereof. However, it is understood that the methods or processes can be distributed differently. For example, the various methods or processes can be implemented in a different device, or the functionalities of the modules can be distributed across multiple devices. Also as an example, the various methods or processes can be stored in a non-transitory memory medium.

As a more specific example, one or more steps described above can be stored in the non-transitory memory medium for distribution to a different system, a different device, a different user, or a combination thereof. Also as a more specific example, the steps described above can be implemented or stored using a single hardware circuit grouping, such as a chip or a processor, or across multiple hardware circuit groupings.

The steps described in this application can be stored in the non-transitory computer readable medium. The first storage circuit 414 of FIG. 4, the second storage circuit 446 of FIG. 4, the third storage circuit 514 of FIG. 5, or a combination thereof can represent the non-transitory computer readable medium. The first storage circuit 414, the second storage circuit 446, the third storage circuit 514, or a combination thereof, or a portion therein can be removable from the first device 102, the second device 106, the third device 108, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising: a control circuit configured to: determine a privacy baseline for controlling communication for a user; receive an application-specific privacy setting for controlling communication for a first executable program associated with the user; generate a user-specific privacy profile based on the privacy baseline and the application-specific privacy setting, the user-specific privacy profile for controlling an application set including a second executable program; further generate the user-specific privacy profile based on analyzing the first executable program, the second executable program, the application set, or a combination thereof; present a graphical risk summary based on the user-specific privacy profile, the graphical risk summary for visually representing communication control for the user; receive an intended value of a risk score through the graphical risk summary upon an arrow indicator being moved to the intended value of the risk score by the user, and determine a corresponding application-specific privacy setting based on the intended value of the risk score, for the first executable program, the second executable program, or the application set; and a storage circuit, coupled to the control circuit, configured to store the user-specific privacy profile.

2. The system as claimed in claim 1 wherein the control circuit is configured to:

determine a function for implementing the first executable program;

determine the application-specific privacy setting corresponding to the function for controlling communication for the function of the first executable program; and generate the user-specific privacy profile based on the function for controlling communication for the function of the second executable program.

3. The system as claimed in claim 1 wherein the control circuit is configured to present the graphical risk summary, wherein the graphical risk summary includes an indicator indicating the intended value of the risk score.

4. The system as claimed in claim 1 wherein the control circuit is configured to generate the user-specific privacy profile based on generating an application privacy recommendation for controlling the second executable program, wherein the application privacy recommendation is based on the application-specific privacy setting corresponding to the first executable program.

5. The system as claimed in claim 1 wherein the control circuit is configured to generate the user-specific privacy profile for controlling communication for the application set corresponding to a first device, a second device, a third device or a combination thereof.

6. The system as claimed in claim 1 wherein the control circuit is configured to: determine the privacy baseline for controlling communication for the user across the application set.

7. The system as claimed in claim 1 wherein the control circuit is configured to generate the user-specific privacy profile using a heterogeneous analysis mechanism for analyzing the first executable program, the second executable program, or a combination thereof based on an application library, an application type, a community feedback, or a combination thereof beyond metadata for the first executable program, the second executable program, or a combination thereof.

8. The system as claimed in claim 1 wherein the control circuit is configured to:

determine a function for implementing the first executable program;

determine the application-specific privacy setting corresponding to the function for controlling communication for the function of the first executable program; and generate the user-specific privacy profile based on the function for controlling communication for the function across the application set.

9. The system as claimed in claim 6 wherein the control circuit is configured to generate the user-specific privacy profile based on generating an application privacy recommendation based on comparing the privacy baseline, the application-specific privacy setting, the first executable program, the second executable program, the application set, or a combination thereof.

10. The system as claimed in claim 6 wherein the control circuit is configured to:

determine a usage context for representing the user utilizing the first executable program, the second executable program, or a combination thereof and generate the user-specific privacy profile for controlling communication for the application set based on the usage context.

11. A method of operation of a computing system comprising: determining a privacy baseline for controlling communication for a user; determining an application-specific privacy setting for controlling communication for a first executable program associated with the user; generating with a control circuit a user-specific privacy profile based on the privacy baseline and the application-specific privacy setting, the user-specific privacy profile for controlling an application set including a second executable program; further generating the user-specific privacy profile based on analyzing the first executable program, the second executable program, the application set, or a combination thereof; presenting a graphical risk summary based on the user-specific privacy profile, the graphical risk summary for visually representing communication control for the user; and receiving an intended value of a risk score through the graphical risk summary upon an arrow indicator being moved to the intended value of the risk score by the user, and determining a corresponding application-specific privacy setting based on the intended value of the risk score, for the first executable program, the second executable program, or the application set.

12. The method as claimed in claim 11 further comprising:

determining a function for implementing the first executable program;

wherein:

determining the application-specific privacy setting includes determining the application-specific privacy setting corresponding to the function for controlling communication for the function of the first executable program; and generating the user-specific privacy profile includes generating the user-specific privacy profile based on the function for controlling communication for the function of the second executable program.

13. The method as claimed in claim 11 further comprising presenting the graphical risk summary, wherein the graphical risk summary includes an indicator indicating the intended value of the risk score.

14. The method as claimed in claim 11 wherein generating the user-specific privacy profile includes generating the user-specific privacy profile based on generating an application privacy recommendation for controlling the second executable program, wherein the application privacy recommendation is based on the application-specific privacy setting corresponding to the first executable program.

15. The method as claimed in claim 11 wherein generating the user-specific privacy profile includes generating the user-specific privacy profile for controlling communication for the application set corresponding to a first device, a second device, a third device, or a combination thereof.

16. A non-transitory computer readable medium including instructions executable by a control circuit for a computing system, the instructions comprising: determining a privacy baseline for controlling communication for a user; determining an application-specific privacy setting for controlling communication for a first executable program associated with the user; generating a user-specific privacy profile based on the privacy baseline and the application-specific privacy setting, the user-specific privacy profile for controlling an application set including a second executable program; further generating the user-specific privacy profile based on analyzing the first executable program, the second executable program, the application set, or a combination thereof; presenting a graphical risk summary based on the user-specific privacy profile, the graphical risk summary for visually representing communication control for the user; and receiving an intended value of a risk score through the graphical risk summary upon an arrow indicator being moved to the intended value of the risk score by the user, and determining a corresponding application-specific privacy setting based on the intended value of the risk score, for the first executable program, the second executable program, or the application set.

17. The non-transitory computer readable medium as claimed in claim 16, the instructions further comprising:

determining a function for implementing the first executable program;

wherein:

determining the application-specific privacy setting includes determining the application-specific privacy setting corresponding to the function for controlling communication for the function of the first executable program; and generating the user-specific privacy profile includes generating the user-specific privacy profile based on the function for controlling communication for the function of the second executable program.

18. The non-transitory computer readable medium as claimed in claim 16, the instructions further comprising presenting the graphical risk summary, wherein the graphical risk summary includes an indicator indicating the intended value of the risk score.

19. The non-transitory computer readable medium as claimed in claim 16 wherein generating the user-specific privacy profile includes generating the user-specific privacy profile based on generating an application privacy recommendation for controlling the second executable program, wherein the application privacy recommendation is based on the application-specific privacy setting corresponding to the first executable program.

20. The non-transitory computer readable medium as claimed in claim 16 wherein generating the user-specific privacy profile includes generating the user-specific privacy profile for controlling communication for the application set corresponding to a first device, a second device, a third device, or a combination thereof.

* * * * *